United States Patent
Ishiwada et al.

(10) Patent No.: US 6,862,126 B2
(45) Date of Patent: Mar. 1, 2005

(54) TRANSMISSION WAVELENGTH CHARACTERISTICS VARIABLE OPTICAL ELEMENT, AND WAVELENGTH CHARACTERISTICS VARIABLE APPARATUS, OPTICAL AMPLIFIER, OPTICAL TRANSMISSION SYSTEM, AND CONTROL METHOD OF TRANSMISSION WAVELENGTH CHARACTERISTICS, USING SAME

(75) Inventors: Takashi Ishiwada, Sapporo (JP); Hirotomo Izumi, Sapporo (JP); Hiroshi Nagaeda, Sapporo (JP); Nobuaki Mitamura, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/286,779

(22) Filed: Nov. 4, 2002

(65) Prior Publication Data

US 2003/0174381 A1 Sep. 18, 2003

(30) Foreign Application Priority Data

Mar. 14, 2002 (JP) ........................................ 2002-070870

(51) Int. Cl.[7] .............................. G02F 1/09; G02F 1/07; G01B 9/02
(52) U.S. Cl. ........................ 359/280; 359/260; 359/322; 356/454
(58) Field of Search ................................ 359/260, 280, 359/322, 237, 324, 256, 738, 484, 494; 385/14, 24, 16; 356/454

(56) References Cited

U.S. PATENT DOCUMENTS

| 5,212,584 | A | * | 5/1993 | Chung | 359/260 |
|---|---|---|---|---|---|
| 6,330,097 | B1 | * | 12/2001 | Chen et al. | 359/239 |
| 6,339,492 | B1 | | 1/2002 | Terahara et al. | 359/280 |

(List continued on next page.)

FOREIGN PATENT DOCUMENTS

| JP | 59-151065 | 8/1984 |
|---|---|---|
| JP | 61-279806 | 12/1986 |
| JP | 09-021608 | 1/1997 |
| JP | 11-014939 | 1/1999 |
| JP | 11-162032 | 6/1999 |
| JP | 11-212044 | 8/1999 |

OTHER PUBLICATIONS

Noriyuki Takeda et al., "Gain Equalization of Er–doped Fiber Amplifier using Etalon Filter" The Institute of Electronics, Information and Communication Engineers, Society Congress 1995, B759.

Kazuyou Mizuno et al., "Development of Etalon–Type Gain–Flattening Filter" Furukawa Review, No. 19, 2000.

*Primary Examiner*—Georgia Epps
*Assistant Examiner*—M. Hasan
(74) *Attorney, Agent, or Firm*—Staas & Halsey LLP

(57) ABSTRACT

The present invention aims at providing a transmission wavelength characteristics variable optical element which can actively equalize changes of the wavelength characteristics due to temperature changes, and providing a wavelength characteristics variable apparatus, an optical amplifier, an optical transmission system, and a control method of the transmission wavelength characteristics, which use such an optical element. To this end, the transmission wavelength characteristics variable optical element according to the present invention comprises: an light interference section in which for example reflection films are formed on a light incident plane and a light emitting plane of a magneto-optic crystal; a permanent magnet that applies a fixed magnetic field to the magneto-optic crystal; an electromagnet that applies a variable magnetic field in a direction different from that of the fixed magnetic field; and a variable current source that controls the current flowing in the electromagnet, and varies transmission wavelength characteristics which occur due to an interference of light multireflected between the reflection films, by changing a Faraday rotation angle given to the light being propagated within the magneto-optic crystal, corresponding to a synthetic magnetic field formed by the fixed magnetic field and the variable magnetic field.

40 Claims, 15 Drawing Sheets

U.S. PATENT DOCUMENTS

| | | | |
|---|---|---|---|
| 6,437,904 B1 | * | 8/2002 | Reeder ........................ 359/322 |
| 2002/0118434 A1 | * | 8/2002 | Cao ............................ 359/256 |
| 2002/0176659 A1 | * | 11/2002 | Lei et al. ...................... 385/24 |
| 2003/0161567 A1 | * | 8/2003 | Baxter et al. ................. 385/11 |

* cited by examiner

FIG.3
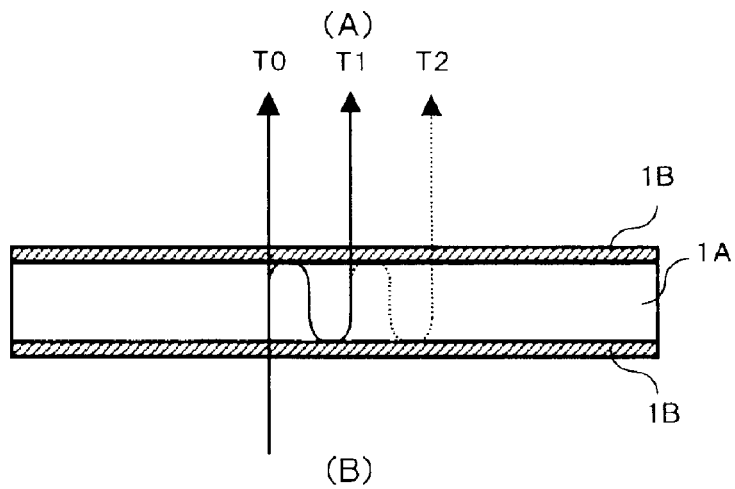
(A)
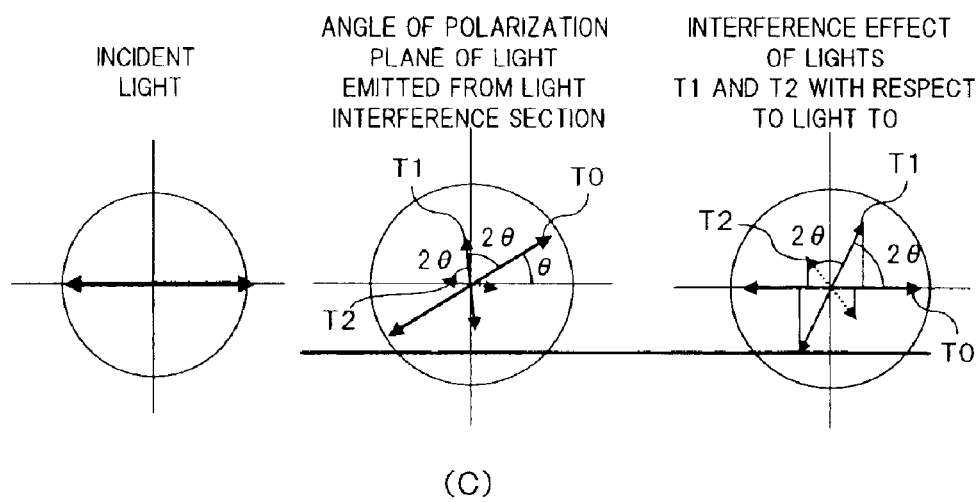
(B)
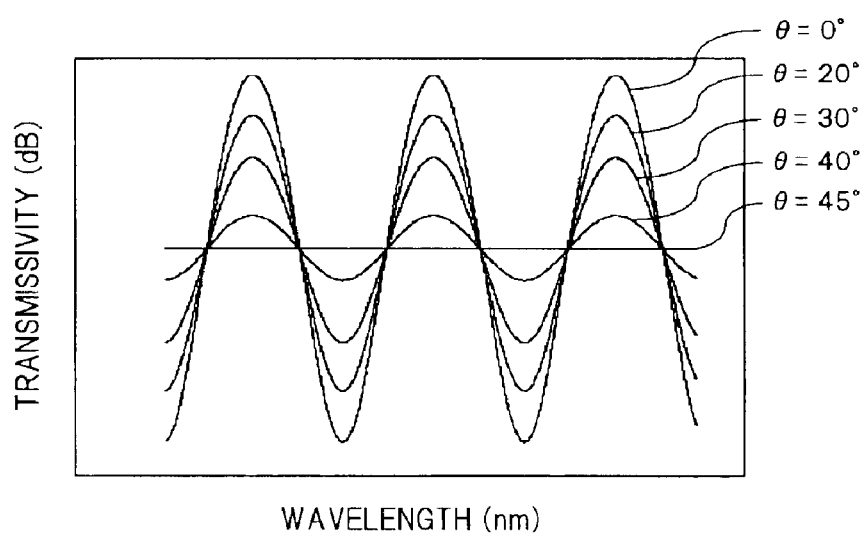
(C)

TRANSMISSION WAVELENGTH CHARACTERISTICS VARIABLE OPTICAL ELEMENT, AND WAVELENGTH CHARACTERISTICS VARIABLE APPARATUS, OPTICAL AMPLIFIER, OPTICAL TRANSMISSION SYSTEM, AND CONTROL METHOD OF TRANSMISSION WAVELENGTH CHARACTERISTICS, USING SAME

BACKGROUND OF THE INVENTION

1. Field of the Invention

The present invention relates to an etalon-type optical element capable of varying periodic transmission wavelength characteristics of an optical element, which is used in the field of optical communications or the like, and a wavelength characteristics variable apparatus, an optical amplifier, an optical transmission system and a control method of transmission wavelength characteristics, using the etalon-type optical element.

2. Description of the Related Art

In optical transmission systems which transmit optical signals over a long distance, there has been recently employed a wavelength division multiplexing (WDM) optical transmission system that increases the number of optical amplification repeaters for increasing long-distance transmission, and also multiplexes a plurality of optical signals having different wavelengths to transmit the multiplexed optical signals for increasing the transmission quantity. With this WDM optical transmission system, WDM optical signals are amplified together in the optical amplification repeater and transmitted. As the optical amplifier for the repeater, for example, an erbium (Er)-doped optical fiber amplifier (EDFA) is widely used.

However, gain characteristics of this EDFA have generally wavelength dependency based on the composition of a base material of optical fiber, and hence the gain characteristics do not become completely flat gain wavelength characteristics in the wavelength band of such as from 1.5 $\mu$m to 1.6 $\mu$m, which is used in the long-distance optical transmission. Therefore, when the number of optical amplification repeaters are increased, the wavelength dependency is increased, thereby causing a problem in that a deviation in signal-to-noise ratio of light (optical SNR) is increased between each wavelength (channel).

As a conventional technique for solving such a problem, there is known a technique in which, for example, an etalon-type optical element (optical filter) having transmission (or loss) wavelength characteristics opposite to the gain wavelength characteristics of the EDFA is inserted in the optical amplifier or on the optical transmission line as a gain equalizer (GEQ), to flatten the gain wavelength characteristics (specifically, see "Gain Equalization of Er-doped Fiber Amplifier using Etalon Filter" Takeda, et al., The Institute of Electronics, Information and Communication Engineers, 1995 Autumn General Meeting, B-759, and "Development of Etalon-type Gain Flattening Filter", Mizuno et al., Furukawa Electric Review No. 105, January 2000).

Furthermore, in a wavelength equalizing apparatus described in Japanese Unexamined Patent Publication No. 11-162032, there is proposed a technique in which parameters of a plurality of optical filters each having periodic transmission wavelength characteristics are determined by Fourier series expansion of wavelength characteristics inverse to given wavelength characteristics, and these optical filters are serially connected to thereby compensate for the wavelength characteristics.

It is known that the gain wavelength characteristics of the above described EDFA are varied depending on the fluctuation of ambient temperature. In the erbium-doped optical fiber (EDF), further, the composition of the base material, particularly, variations in the concentration of additive such as aluminum (Al) may occur in the manufacturing process, and hence the gain wavelength characteristics of the EDFA may be varied depending on the concentration of Al. The gain wavelength characteristics of the EDFA are also varied when a control for maintaining an output light level constant (output fixing control: ALC) is being performed by changing the gain, in the case where an input light level is fluctuated.

It is desired that the transmission wavelength characteristics of the above described gain equalizer can be variably controlled, with respect to such changes of the gain wavelength characteristics of the EDFA. However, with the etalon-type optical filter used in the conventional gain equalizer, it is difficult to flexibly change the loss wavelength characteristics of the gain equalizer, corresponding to the change of the gain wavelength characteristics of the EDFA, since the transmission wavelength characteristics are fixed by the distance between the parallel reflection films constituting the Fabry-Perot interferometer, the reflectance of each reflection film or the like.

The present applicant has disclosed a variable optical filter utilizing the magneto-optical effect in Japanese Unexamined Patent Publication No. 11-212044, and has proposed a technique for constructing a gain equalizer or the like by connecting the above described variable optical filters in multi-stages, in Japanese Unexamined Patent Publication No. 12-137604. The variable optical filter used in this gain equalizer or the like is different from the above described etalon-type optical filter, but is an optical element in which the shape of the transmission wavelength characteristics which change periodically is made variable in the axial direction of the transmittance, by using a Faraday rotator. As the technique related to an optical element using the Faraday rotator, there are known other various techniques which are disclosed in Japanese Unexamined Patent Publications No. 61-279806, No. 11-14939, No. 9-21608, and No. 59-151065.

When such variable optical filters which use the Faraday rotator are connected in multiple stages to constitute a gain equalizer or the like, the above described Fourier series expansion method is effective as one method of designing the transmission wavelength characteristics of each variable optical filter. However, it is not so easy to realize a variable optical filter having transmission wavelength characteristics which are matched with the "sine" function of each term expanded by the Fourier series with high accuracy, only by using the magneto-optical effect.

SUMMARY OF THE INVENTION

The present invention takes the above points into account, with the object of easily realizing a transmission wavelength characteristics variable optical element, which can actively equalize changes of the wavelength characteristics in an optical amplifier or the like due to temperature changes by an etalon-type construction, and also providing an wavelength characteristics variable apparatus, an optical amplifier, an optical transmission system, and a control method of the transmission wavelength characteristics, which use such an optical element.

In this specification, "equalization" means that undesirable transmission wavelength characteristics are compensated so that they become the same or approximately same characteristics as desirable transmission wavelength characteristics.

In order to achieve the above object, the transmission wavelength characteristics variable optical element according to the present invention is capable of giving a variable Faraday rotation angle to transmitted light, and comprises a structure in which light reflection occurs respectively on a light incident plane and a light emitting plane to operate as a Fabry-Perot interferometer, to thereby make periodic transmission wavelength characteristics variable.

In the optical element having such a construction, the light entering into the light incident plane is reflected between the light incident plane and the light emitting plane, while the polarization direction thereof is rotated in a certain direction by the Faraday rotation, so that the transmitted light emitted from the light emitting plane and the reflected light interfere with each other. As a result, the optical element functions as the Fabry-Perot interferometer. At this time, a light interference phenomenon occurs corresponding to the polarization of the lights spatially overlapping each other. Therefore, by changing the Faraday rotation angle given to each light, it becomes possible to change the periodic transmission wavelength characteristics by the Fabry-Perot interferometer in the axial direction of the transmittance.

Moreover, the optical element may comprise: a magneto-optic crystal having a light incident plane and a light emitting plane parallel with each other; reflection films respectively formed on the light incident plane and light emitting plane of the magneto-optic crystal; a fixed magnetic field generation section that gives a fixed magnetic field to the magneto-optic crystal; a variable magnetic field generation section that gives a variable magnetic field to the magneto-optic crystal in a direction different from that of the fixed magnetic field; and a variable magnetic field control section that controls the variable magnetic field generated by the variable magnetic field generation section, to vary the transmission wavelength characteristics which occur due to the interference of light multireflected between the reflection films by changing the Faraday rotation angle given to light being propagated within the magneto-optic crystal, corresponding to a synthetic magnetic field formed by the fixed magnetic field and the variable magnetic field.

With such a construction, the Faraday rotation angle given to the light which is transmitted and multireflected in the magneto-optic crystal is changed according to the synthetic magnetic field formed by the fixed magnetic field and the variable magnetic field, and thus it becomes possible to change the transmission wavelength characteristics by changing an application condition of the variable magnetic field by the variable magnetic field control section.

As a specific construction of the optical element, the reflection film may have a reflectance of from 5% to 50% inclusive. By setting the reflectance of the reflection film to the above range, the variable transmission wavelength characteristics can be approximated to the "sine" function with relatively high accuracy.

The wavelength characteristics variable apparatus according to the present invention is a wavelength characteristics variable apparatus using the above described transmission wavelength characteristics variable optical element, which comprises: a first optical device that determines the polarization of light entering into the optical element, a second optical device that cuts out specific polarized light from the light emitted from the optical element, and a variable Faraday rotator that is arranged between the first optical device and the second optical device, and gives a Faraday rotation angle according to the Faraday rotation angle given to the transmitted light by the optical element. The variable Faraday rotator preferably gives a Faraday rotation angle which is in an opposite rotation direction and which has substantially the same size with respect to the Faraday rotation angle in the optical element to the transmitted light.

In the wavelength characteristics variable apparatus having such a construction, the polarizations of the incident light and the emitting light with respect to the optical element are determined by the first optical device and the second optical device, and also the Faraday rotation angle given by the optical element is compensated by the variable Faraday rotator. Thereby, it becomes possible to realize a polarization independent type wavelength characteristics variable apparatus, in which the transmittance in the optical element does not depend on the polarization of input light.

Further, as a specific construction, the wavelength characteristics variable apparatus may have; a first lens for supplying the light emitted from a core end face of a first optical fiber to the first optical device, and a second optical lens which converges the light emitted from the second optical device and combines the converged light to a core end face of a second optical fiber under a predetermined condition. Moreover, the first optical device and the second optical device may be a wedge plate or a flat plate comprising a polarizer or a birefringent material.

In addition, the above described wavelength characteristics variable apparatus may be modularized to serially connect a plurality of modules, and the period of each module with respect to the wavelength in the transmission wavelength characteristics may be set so as to be different to each other, to thereby obtain variable transmission wavelength characteristics corresponding to the sum of respective transmission wavelength characteristics. By having such a construction, it becomes possible to realize transmission wavelength characteristics having a more complicated shape.

Furthermore, the above described wavelength characteristics variable apparatus may comprise: a light branching section that branches a part of light before being transmitted through the optical element or a part of light after having been transmitted through the optical element; a wavelength characteristics measuring section that measures the wavelength characteristics of the branched light from the light branching section; and a control section that adjusts the Faraday rotation angle given to the transmitted light by the optical element to control the transmission wavelength characteristics, based on the measurement result of the wavelength characteristics measuring section.

With such a construction, the wavelength characteristics of the incident light into the optical element and the emitting light from the optical element are measured, and based on the measurement results, the transmission wavelength characteristics of the optical element is feedforward controlled or feedback controlled. As a result, light having stable wavelength characteristics can be output.

The optical amplifier according to the present invention comprises the above described wavelength characteristics variable apparatus, and equalization of gain wavelength characteristics is performed by the wavelength characteristics variable apparatus. Specifically, the optical amplifier is preferably constructed to comprise: an optical amplifying section that amplifies light entering into the wavelength characteristics variable apparatus (for example, a WDM optical signal), a measurement section that measures data related to gain wavelength characteristics of the optical amplifying section, and a control section that controls the transmission wavelength characteristics by adjusting the Faraday rotation angle given to the transmitted light by the optical element of the wavelength characteristics variable apparatus, based on the measurement result of the measurement section, so that the gain wavelength characteristics of the optical amplifying section can be equalized.

In the optical amplifier having such a construction, even if a change of the gain wavelength characteristics of the optical amplifying section occurs due to temperature change or the like, the gain wavelength characteristics can be actively equalized by the wavelength characteristics variable apparatus whose transmission wavelength characteristics are optimized by the control section.

As a specific construction of the optical amplifier, the measurement section may measure the temperature of the optical amplifying section or the wavelength characteristics of output light, and the control section may control the transmission wavelength characteristics of the wavelength characteristics variable apparatus so that the gain wavelength characteristics based on the measurement result of the measurement section can be equalized. Moreover, the control section may control the transmission wavelength characteristics of the wavelength characteristics variable apparatus, according to the wavelength characteristics determined by the Fourier series expansion of the inverse of the gain wavelength characteristics of the optical amplifying section.

The optical amplifying section may include a rare earth element-doped optical fiber amplifier. In this case, the measurement section measures input light power, pumping light power, and temperature with regard to the optical amplifying section, and the control section judges the gain wavelength characteristics of the optical amplifying section based on the input light power, the pumping light power, and the temperature measured by the measurement section, to control the transmission wavelength characteristics of the wavelength characteristics variable apparatus so that the gain wavelength characteristics of the optical amplifying section can be equalized.

The optical transmission system according to the present invention is an optical transmission system that transmits an optical signal from an optical sender to an optical receiver via an optical transmission line, wherein the above described wavelength characteristics variable apparatus according to the present invention is provided on the optical transmission line. The optical transmission system may comprise a plurality of optical repeaters on the optical transmission line, and the wavelength characteristics variable apparatus may be arranged for each previously set repeating section.

Another embodiment of the optical transmission system according to the present invention is an optical transmission system that repeatedly transmits an optical signal from an optical sender to an optical receiver via an optical transmission line and an optical repeater, wherein the optical repeater includes the above described optical amplifier according to the present invention.

According to the optical transmission system having such a construction, the wavelength dependency of the optical signal transmitted from the optical sender to the optical receiver is compensated (equalized) by the optical repeater comprising the wavelength characteristics variable apparatus according to the present invention which is arranged on the optical transmission line, or the optical amplifier according to the present invention. As a result, it becomes possible to receive the optical signal in which the optical SNR is equalized at the optical receiver.

The control method of transmission wavelength characteristics according to the present invention is a method comprising: generating periodic transmission wavelength characteristics by multiple reflection of light between a first reflection plane and a second reflection plane; and variably controlling the transmittance without changing the period of the transmission wavelength characteristics. As a result, it becomes possible to change the periodic transmission wavelength characteristics in the axial direction of the transmittance.

Other objects, features and advantages of the present invention will become apparent from the following description of embodiments with reference to the accompanying drawings.

BRIEF DESCRIPTION OF THE DRAWINGS

FIG. 3 is a diagram for explaining the transmission wavelength characteristics in the first embodiment, wherein (A) is a diagram schematically showing aspects of multiple reflection of light in the light interference section; (B) is a diagram for explaining a Faraday rotation angle of each multireflected light; and (C) is a diagram showing the transmission wavelength characteristics of the optical element corresponding to the Faraday rotation angle.

DETAILED DESCRIPTION OF THE INVENTION

Embodiments of the present invention will be described below with reference to the drawings.

Figure 1:
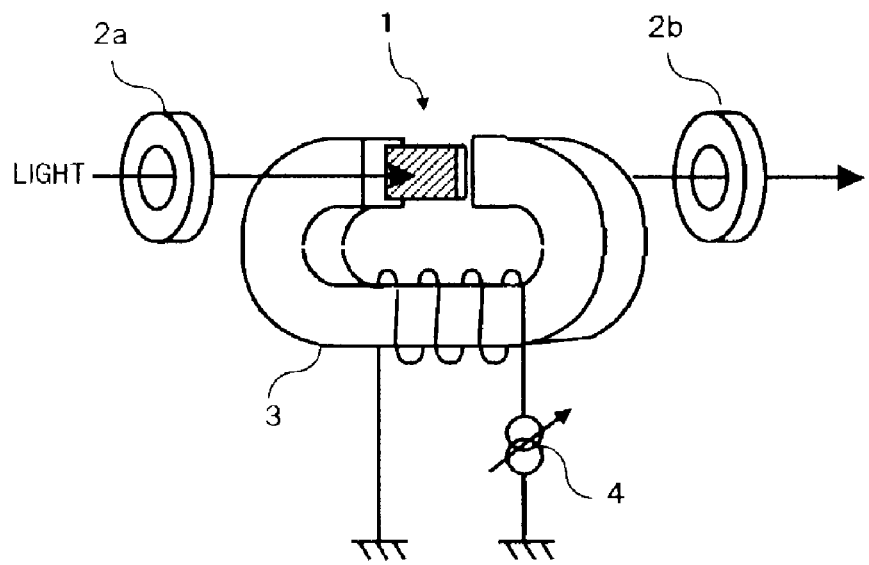
FIG. 1 is a perspective view showing the basic construction of a transmission wavelength characteristics variable optical element, according to a first embodiment of the present invention.

FIG. 1 is a perspective view showing the basic construction of a transmission wavelength characteristics variable optical element, according to a first embodiment of the present invention.

In FIG. 1, the optical element has, for example, a light interference section 1 having a magneto-optic crystal provided with a function as an etalon (Fabry-Perot interferometer), permanent magnets 2a, 2b and an electromagnet 3 for applying magnetic fields to the light interference section 1 in directions orthogonal to each other, and a variable current source 4 for providing a drive current to the electromagnet 3.

Figure 2:
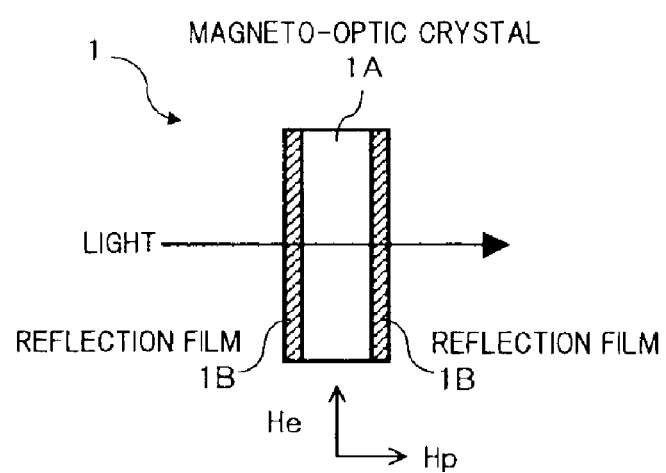
FIG. 2 is an upper side sectional view of a light interference section in the first embodiment.

The light interference section 1 is constructed, as shown in the upper side sectional view of FIG. 2, for example, by forming reflection films 1B, 1B consisting of a dielectric multilayer film and having required reflectance, on two parallel planes of a magneto-optic crystal 1A. The magneto-optic crystal 1A is a known magneto-optic crystal providing a variable Faraday rotation angle to light being transmitted through the crystal. Generally, the Faraday rotation is a phenomenon that when light passes through a magneto-optic crystal in a state where the magneto-optic crystal is placed in a certain magnetic field, the polarization direction of the light is always rotated in a certain direction, regardless of the propagation direction of the light. The size of the rotation angle in the polarization direction (Faraday rotation angle) depends on the direction and the strength of magnetization of the magneto-optic crystal caused by the applied magnetic field. The reflection films 1B, 1B constitute a so-called Fabry-Perot interferometer that multireflects the light entering into one of the parallel planes of the magneto-optic crystal 1A between the one plane and the other plane to emit light interfering with each other. The reflection films 1B, 1B may be formed with films having reflectances different from each other. When the reflectance of the reflection film formed on the incident plane of the light is made higher than that of the reflection film formed on the emitting plane, the transmittance of the transmission wavelength characteristics is increased.

The permanent magnets 2a and 2b apply a fixed magnetic field Hp in the parallel direction with respect to the propagation direction of light (ray direction) entering into the light interference section 1. It is assumed that this fixed magnetic field Hp provides a magnetic field sufficient for saturating the magnetization of the magneto-optic crystal 1A. These permanent magnets 2a and 2b may be electromagnets. When electromagnets are used, the saturation magnetic field or variable magnetic field may be provided by these electromagnets.

The electromagnet 3 applies a variable magnetic field He of the strength corresponding to a current value of the variable current source 4, perpendicularly to the ray direction of the incident light. Therefore, the direction and strength of the synthetic magnetic field Hp+He of the fixed magnetic field Hp and the variable magnetic field He are changed by adjusting the current value of the variable current source 4. One example is shown here, in which the variable magnetic field is applied to the magneto-optic crystal 1A by the combination of the permanent magnets 2a and 2b, and the electromagnet 3, but the magnetic field application method in the present invention is not limited thereto. Further, the fixed magnetic field and the variable magnetic field are applied in directions orthogonal to each other, but the direction of each magnetic field may be set so as to be different to each other, not only in the orthogonal direction.

The transmission wavelength characteristics of the optical element having the basic construction described above will be described.

FIG. 3 is a diagram for explaining the transmission wavelength characteristics of the present optical element, wherein (A) is a diagram schematically showing aspects of multiple reflection of light in the light interference section 1; (B) is a diagram for explaining the Faraday rotation angle of each multireflected light; and (C) is a diagram showing the transmission wavelength characteristics of the optical element corresponding to the Faraday rotation angle.

In this optical element, when light enters into the light interference section 1, the incident light is multireflected to interfere with each other, while the polarization direction thereof is rotated in a certain direction due to the Faraday rotation within the magneto-optic crystal 1A. The interference phenomenon of the light at this time is such that in the spatially overlapped light, the interference phenomenon occurs most largely with respect to the light whose polarization is in the same direction, and does not occur with respect to the light whose polarization is in the orthogonal direction. Therefore, for the multireflected lights emitted from the light interference section 1, the polarization directions thereof are different to each other corresponding to the Faraday rotation angle provided in the magneto-optic crystal 1A. As a result, the effect of the optical interference is reduced compared to the conventional etalon which does not provide the Faraday rotation angle.

Specifically, in (A) of FIG. 3, it is assumed that the light having been transmitted through the magneto-optic crystal 1A without being reflected therein is T0, the light reflected once by each of the reflection films 1B, 1B at the edges of the crystal (total twice) and then emitted is T1, the light reflected twice by each of the reflection film 1B, 1B at the edges of the crystal (total four times) and then emitted is T2, and the Faraday rotation angle provided while the light is propagated from one reflection film 1B to the other reflection film 1B is θ. Then, a polarization direction of each of the lights T0, T1 and T2 becomes such that as shown in the middle of (B) of FIG. 3, the polarization direction of the light T0 is θ, the polarization direction of the light T1 is 3θ(=θ+2θ), and the polarization direction of the light T2 is 5θ(=θ+2θ+2θ), with respect to the polarization direction of the light entered into the magneto-optic crystal 1A shown on the left hand side of (B) of FIG. 3.

The interference effect of the light T1 with respect to the light T0 occurs, as shown on the right hand side of (B) of FIG. 3, corresponding to a component (cos 2θ component) in which a vector expressed by making the amplitude (strength) of the light T1 correspond to the polarization direction is projected in the polarization direction of the light T0. The interference effect of the light T2 with respect to the light T0 also occurs corresponding to a component (cos 4θ component) in which a vector expressed by making the amplitude of the light T2 correspond to the polarization direction is projected in the polarization direction of the light T0. Moreover, each amplitude (strength) of the light T1 and the light T2 is decreased in proportion to the product of the square of the reflection frequency and the reflectance. Therefore, when the reflectance of the reflection film 1B is not higher than 50%, the strength of the light T2 having the reflection frequency of four times only reaches about 6% at most with respect to the strength of the light T0. Hence, the interference effect of the light T0 and the light T1 becomes predominant with respect to the transmission wavelength characteristics due to the multiple reflection.

The interference effect of the multireflected light in the present optical element becomes maximum, as shown in (C) of FIG. 3, at the Faraday rotation angle θ=0°, at which the polarization direction of each light becomes parallel, and transmission wavelength characteristics similar to those of the conventional etalon can be obtained. By gradually increasing the Faraday rotation angle θ, the interference effect of the light T0 and the light T1 is reduced, and when the Faraday rotation angle θ becomes 45°, at which each polarization direction of the light T0 and the light T1 becomes orthogonal to each other, the interference effect becomes substantially zero, and the transmission wavelength characteristics become flat.

As described above, according to the present optical element, it becomes possible to vary the periodic transmission wavelength characteristics caused by the interference phenomenon of light multireflected between the reflection films 1B, 1B in the axial direction of the transmittance thereof, by adjusting the current value of the variable current source 4 to change the Faraday rotation angle θ in the magneto-optic crystal 1A. Further, when it is assumed that the wavelength of light is λ, a refractive index of the magneto-optic crystal 1A is n, and the thickness of the magneto-optic crystal 1A (the distance between the reflection films 1B, 1B) is d, the period in the variable transmission wavelength characteristics with respect to the wavelength, that is, the free spectral range (FSR) can be given by the following equation (1).

$$FSR = \lambda^2/(2nd) \quad (1)$$

Therefore, in order to obtain a required FSR for the present optical element, the refractive index and the thickness of the magneto-optic crystal 1A may be designed in accordance with the above equation (1). The optical element can approximate the transmission wavelength characteristics to the "sine" function with relatively high accuracy, by designing a refractive index of the reflection films 1B, 1B formed in the magneto-optic crystal 1A within an adequate range, and can adjust the amplitude of the transmission wavelength characteristics in accordance with the Faraday rotation angle θ. Therefore, for example, it is possible to easily realize an optical element that matches highly accurately with the transmission wavelength characteristics designed by using the known Fourier series expansion method described above. Specifically, in order to approximate the transmission wavelength characteristics of the optical element to the "sine" function with relatively high accuracy, it is desired to set the reflectance of the reflection films 1B, 1B in the range of, for example, from 5% to 50% inclusive. The reflectance of the reflection films used in the present invention is not limited to the above range. However, since it is necessary that the reflection film in the present invention can generate significant reflection, it does not include, for example, a film having a reflectance of 0.1% or less, which is generally used as an anti-reflection film.

A wavelength characteristics variable apparatus using the transmission wavelength characteristics variable optical element according to the present invention will now be described.

Figure 4:
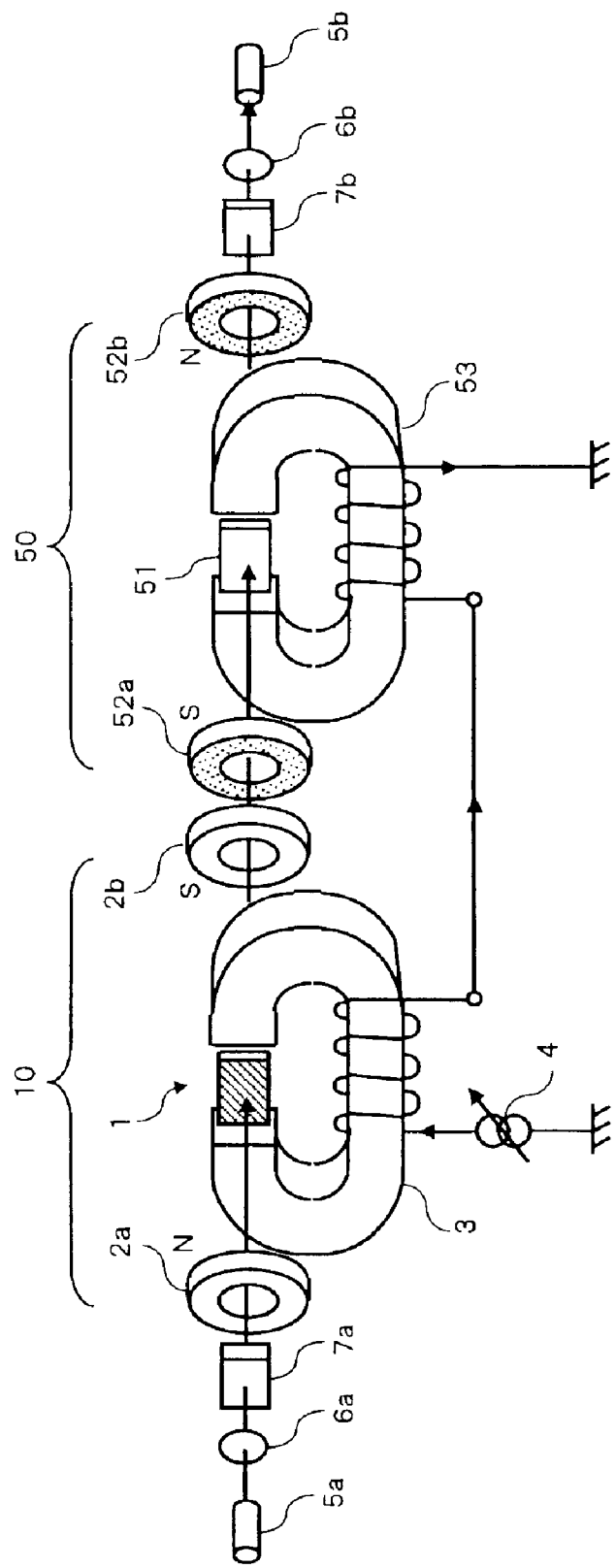
FIG. 4 is a perspective view showing the construction of a wavelength characteristics variable apparatus according to a second embodiment of the present invention.
Figure 5:
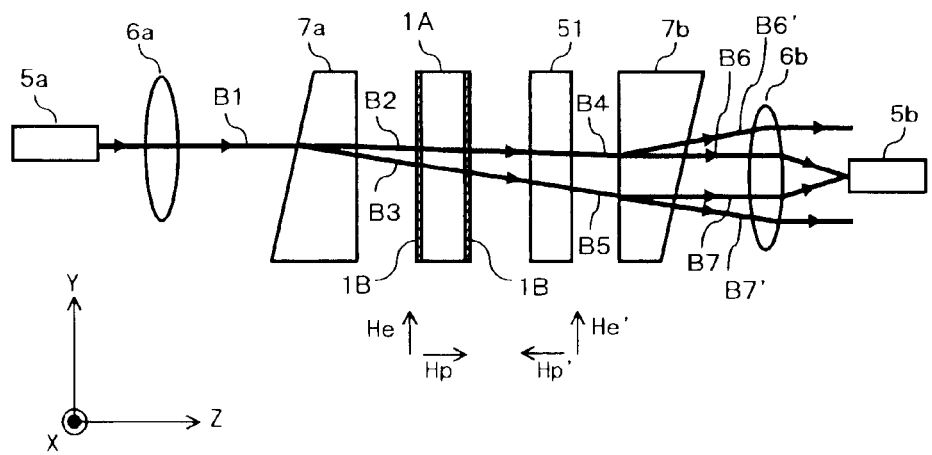
FIG. 5 is a plan view showing a magneto-optic system in the second embodiment.

FIG. 4 is a perspective view showing the construction of a wavelength characteristics variable apparatus according to a second embodiment of the present invention. FIG. 5 is a plan view showing a magneto-optic system in FIG. 4. In FIG. 5, there is also shown the result of ray tracing. In FIG. 4 and FIG. 5, parts similar to the basic construction of the optical element shown in FIG. 1 are denoted by the same reference symbols, and the same applies in the other figures.

In FIG. 4, the present wavelength characteristics variable apparatus is constructed by arranging a first lens 6a, a first wedge plate 7a, an optical element 10 capable of varying wavelength transmission characteristics, a variable Faraday rotator 50, a second wedge plate 7b and a second lens 6b, in this order, in the ray direction of light emitted from a first optical fiber 5a.

The first lens 6a is a lens for changing (for example, collimating) a beam parameter of the light emitted from the first optical fiber 5a to supply it to the first wedge plate 7a. The second lens 6b is for collecting the beams from the second wedge plate 7b to combine the beams to a second optical fiber 5b.

The first wedge plate 7a and the second wedge plate 7b are taper plates comprising a birefringent material. The first wedge plate 7a separates the incident light in arbitrary polarization into two lights in linear polarization, and inputs the separated two lights to the optical element 10. The second wedge plate 7b receives the lights sent from the optical element 10, and changes the light having the polarization component identical to the optical axis (axis having a high refractive index) and the light having the polarization component identical to the axis orthogonal to the optical axis, to lights parallel with each other, to emit those lights to the lens 6b, and the lens 6b collects those lights. At this time, other lights (lights having polarization components other than the optical axis and the axis orthogonal to the optical axis) are diffused so as not to enter into the lens 6b. In order to achieve this, the top and the bottom of the first wedge plate 7a are arranged so as to face the bottom and the top of the second wedge plate 7b, respectively, and also the corresponding planes are arranged to be parallel with each other. Optical axes of the first wedge plate 7a and the second wedge plate 7b are respectively provided on planes consisting of X axis and Y axis at arbitrary angles. Light in the same polarization with respect to the transmission axes of the first wedge plate 7a and the second wedge plate 7b is defined as extraordinary rays, and light in perpendicular polarization is defined as ordinary rays.

The optical element 10 capable of varying wavelength transmission characteristics has the basic construction as shown in FIG. 1. Here, respective permanent magnets 2a and 2b are arranged so that the direction of the fixed magnetic field Hp to be applied to the magneto-optic crystal 1A in the light interference section 1 becomes the direction from the light incident side towards the light emitting side (positive direction of Z axis).

The variable Faraday rotator 50 is for restoring the polarization of an optical signal Faraday-rotated by the optical element 10, to the polarization of that before entering into the optical element 10, and a Faraday rotator having a known construction capable of changing the Faraday rotation angle is used. Here, for example as shown in FIG. 4, the variable Faraday rotator 50 includes a magneto-optic crystal 51 into which the light from the optical element 10 enters, and permanent magnets 52a and 52b and an electromagnet 53 for applying magnetic fields to the magneto-optic crystal 51 in directions orthogonal to each other, and the variable current source 4 of the optical element 10 is commonly used for providing a drive current to the electromagnet 53. The magneto-optic crystal 51 used for the variable Faraday rotator 50 is different from the magneto-optic crystal 1A used for the light interference section 1 of the optical element 10, wherein nothing is formed on the incident plane and the emitting plane of the light, or an anti-reflection film is formed thereon to suppress reflection of light. Therefore, in the magneto-optic crystal 51 of the Faraday rotator 50, multiple reflection of light does not occur, and only the variable Faraday rotation is given to the light being transmitted through the crystal. A Faraday rotation angle $\theta'$ given at this time is set such that the rotation direction thereof is opposite to that of the Faraday rotation angle $\theta$ given by the optical element 10, and the size becomes substantially equal to that of the Faraday rotation angle $\theta$. Here, for example, the Faraday rotation angle $\theta'$ described above, is realized by arranging each of the permanent magnets 52a and 52b so that the direction of a fixed magnetic field Hp' to be applied to the magneto-optic crystal 51 becomes opposite to the fixed magnetic field Hp in the optical element 10, that is, becomes the direction from the light emitting side towards the light incident side (negative direction of the Z axis).

In the wavelength characteristics variable apparatus having the above described construction, the light emitted from the first optical fiber 5a is collimated by the first lens 6a to become a parallel light beam. This parallel light beam is represented by a symbol B1 in FIG. 5, disregarding the thickness of the beam. The beam B1 is separated into a beam B2 corresponding to the ordinary ray and a beam B3 corresponding to the extraordinary ray in the first wedge plate 7a. The beam B2 and the beam B3 pass through the optical element 10 capable of varying transmission wavelength characteristics and the variable Faraday rotator 50, in this order, to become a beam B4 and a beam B5, respectively, and are sent to the second wedge plate 7b. At this time, the polarization of the beam B4 and the beam B5 is respectively restored to the polarization of the beam B2 and the beam B3, since the Faraday rotator 50 gives the Faraday rotation angle $\theta'$ by which the Faraday rotation angle $\theta$ given by the optical element 10 capable of varying transmission wavelength characteristics is offset.

In the second wedge plate 7b, the beam B4 is separated into a beam B6 corresponding to the ordinary ray and a beam B6' corresponding to the extraordinary ray. The beam B5 is also separated into a beam B7 corresponding to the extraordinary ray and a beam B7' corresponding to the ordinary ray in the second wedge plate 7b. When the history of refraction which the beam B6 and the beam B7 have respectively undergone, and the shape and arrangement configuration of each of the wedge plates 7a and 7b are taken into consideration, the beam B6 and the beam B7 become parallel with each other. Therefore, the beam B6 and the beam B7 are narrowed by the second lens 6b, and combined to the core end face of the second optical fiber 5b.

As described above, according to the wavelength characteristics variable apparatus in the second embodiment, it is possible to make the transmittance in the transmission wavelength characteristics variable optical element, independent on the polarization of the input light. That is, it becomes possible to provide a polarization independent type wavelength characteristics variable apparatus using the transmission wavelength characteristics variable optical element.

A wavelength characteristics variable apparatus according to a third embodiment of the present invention will now be described.

Figure 6:
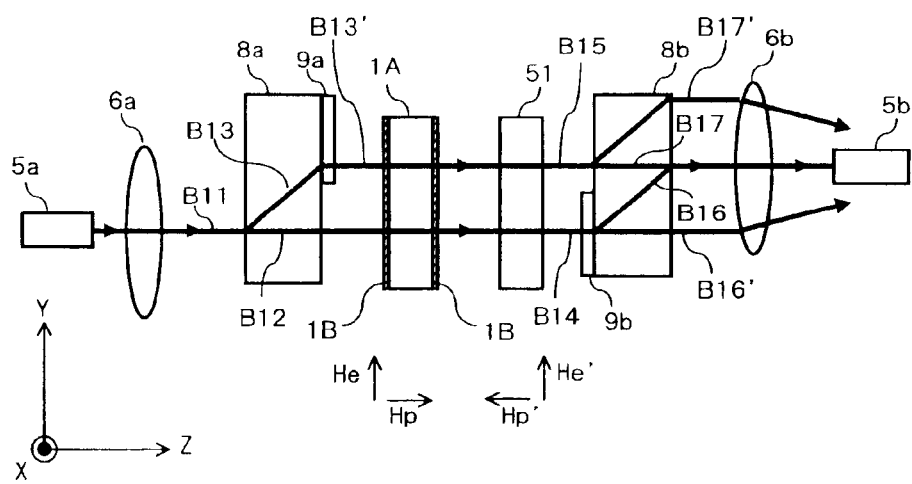
FIG. 6 is a plan view showing a magneto-optic system of a wavelength characteristics variable apparatus according to a third embodiment of the present invention.

FIG. 6 is a plan view showing a magneto-optic system in the wavelength characteristics variable apparatus of the third embodiment.

In FIG. 6, a part in which the construction of the magneto-optic system in the third embodiment is different from the construction of the magneto-optic system in the second embodiment shown in FIG. 5 is that a first flat plate 8a and a second flat plate 8b respectively comprising a birefringent material are used as the first optical device and the second optical device, instead of the first wedge plate 7a and the second wedge plate 7b. The other construction is the same as in the second embodiment shown in FIG. 4 and FIG. 5.

The first flat plate 8a and the second flat plate 8b have the same thickness in the Z axis direction, and for example, optical axes thereof are set to be parallel with each other, and inclined at 45° with respect to the Z axis. Moreover, the first flat plate 8a is provided with a $\lambda/2$ wave plate 9a, at a portion where the extraordinary ray is emitted (upper right portion of the first flat plate 8a in FIG. 6) on the plane facing the light interference section 1 of the optical element 10, and the second flat plate 8b is provided with a $\lambda/2$ wave plate 9b at a portion where the ordinary ray enters on the plane facing the magneto-optic crystal 51 of the Faraday rotator 50.

In the wavelength characteristics variable apparatus having the above described construction, the light emitted from the first optical fiber 5a is collimated by the first lens 6a to become a parallel light beam B11. This beam B11 is separated into a beam B12 corresponding to the ordinary ray and a beam B13 corresponding to the extraordinary ray in the first wedge plate 8a. The beam B13 corresponding to the extraordinary ray passes through the $\lambda/2$ wave plate 9a so that the polarization direction thereof is rotated by 90 degrees to become a beam B13', and the polarization direction of the beam B13' is arranged to be parallel with the polarization direction of the beam B12 corresponding to the ordinary ray. The propagation directions of the beam B12 and the beam B13' thus become parallel with each other. Then, the beam B12 and the beam B13' pass through the optical element 10 capable of varying transmission wavelength characteristics and the variable Faraday rotator 50, in this order, to become a beam B14 and a beam B15, respectively, and are sent to the second flat plate 8b. At this time, the polarization of the beam B14 and the beam B15 is restored, respectively, to the polarization of the beam B12 and the beam B13', since the Faraday rotator 50 gives the Faraday rotation angle $\theta'$ by which the Faraday rotation angle $\theta$ given by the optical element 10 capable of varying transmission wavelength characteristics is offset.

Since the optical axis of the second flat plate 8b is parallel with the optical axis of the first flat plate 8a, the beam B15 passes along the optical path of the beam B17 corresponding to the ordinary ray in the second flat plate 8b. On the other hand, the beam B14 passes through the λ/2 wave plate 9b so that the polarization direction thereof is rotated by 90 degrees, and then passes along the optical path of the beam B16 corresponding to the extraordinary ray in the second flat plate 8b. Since the first flat plate 8a and the second flat plate 8b have the same thickness in the direction of Z axis, with optical axes thereof being parallel with each other, the beam B16 is emitted from a position substantially coinciding with the beam B17. Therefore, the beam B16 and the beam B17 are narrowed by the second lens 6b, and combined to the core end face of the second optical fiber 5b.

As described above, according to the wavelength characteristics variable apparatus in the third embodiment, similar to the case of the second embodiment, it becomes possible to provide a polarization independent type wavelength characteristics variable apparatus using the transmission wavelength characteristics variable optical element. Also in the third embodiment, by respectively providing the λ/2 wave plates 9a and 9b so that the respective beams branched into the ordinary ray and the extraordinary ray by the first flat plate 8a pass along the optical paths of the extraordinary ray and the ordinary ray in the second flat plate 8b, respectively, it becomes possible to eliminate polarization mode dispersion in the wavelength characteristics variable apparatus.

When an influence of the polarization mode dispersion is small in the magneto-optic crystal 1A, it is possible to omit the λ/2 wave plates 9a and 9b. Further, in FIG. 5 and FIG. 6, description has been made for the case in which the first optical device that determines the polarization of the light entering into the optical element and the second optical device that cuts out the light in a specific polarization from the light from the optical element, are the birefringent wedge plate and birefringent flat plate. However, since the first optical device needs only to bring the incident light into a specific polarization, a polarizer can be used as the first optical device. Further, since the second optical device needs only to cut out the specific polarization component from the light from the optical element, an analyzer can be used as the second optical device.

A wavelength characteristics variable apparatus according to a fourth embodiment of the present invention will now be described.

Figure 7:
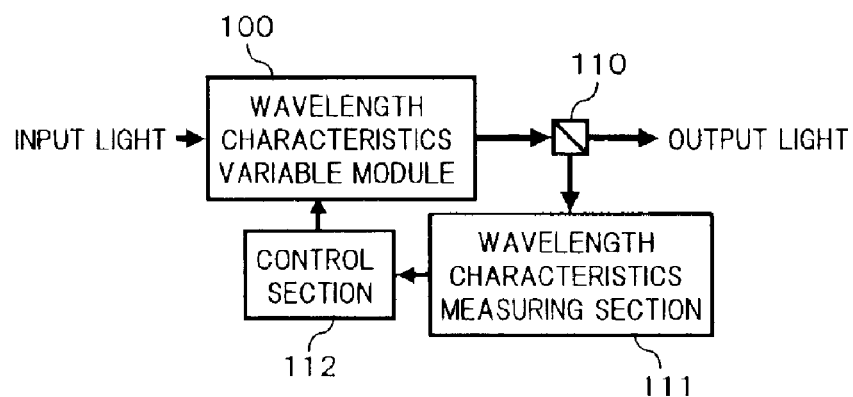
FIG. 7 is a functional block diagram showing the whole construction of a wavelength characteristics variable apparatus according to a fourth embodiment of the present invention.

FIG. 7 is a functional block diagram showing the whole construction of the wavelength characteristics variable apparatus according to the fourth embodiment.

In FIG. 7, the wavelength characteristics variable apparatus includes a wavelength characteristics variable module 100 obtained by modularization of a construction similar to that of the wavelength characteristics variable apparatus in the second or third embodiment, an optical branching device 110 that branches a part of output light from the wavelength characteristics variable module 100, a wavelength characteristics measuring section 111 that measures the wavelength characteristics of the branched light from the optical branching device 110, and a control section 112 that feedback controls transmission wavelength characteristics of the wavelength characteristics variable module 100.

In the wavelength characteristics variable apparatus described above, the light entering into the wavelength characteristics variable module 100 is equalized in accordance with the transmission wavelength characteristics corresponding to the current value of the variable current source 4, to be output to the optical branching device 110. The optical branching device 110 branches a part of the output light from the wavelength characteristics variable module 100 and sends the branched light to the wavelength characteristics measuring section 111 as a monitor light. The wavelength characteristics measuring section 111 measures the optical power with respect to wavelength for the monitor light branched by the optical branching device 110, and transmits the measurement result to the control section 112. The control section 112 adjusts the current value of the variable current source 4 in the wavelength characteristics variable module 100 so that the wavelength characteristics of the optical power measured by the wavelength characteristics measuring section 111 are substantially flattened, thus feedback controlling the transmission wavelength characteristics of the wavelength characteristics variable module 100.

In this manner, according to the wavelength characteristics variable apparatus in the fourth embodiment, the wavelength characteristics of the light output from the wavelength characteristics variable module 100 is monitored, and the transmission wavelength characteristics of the wavelength characteristics variable module 100 is feedback controlled based on the monitoring result. As a result, a wavelength characteristics variable apparatus, which can stably output light having flat wavelength characteristics, can be realized.

In the above fourth embodiment, the transmission wavelength characteristics of the wavelength characteristics variable module 100 are feedback controlled, so that the wavelength characteristics of the monitor light measured by the wavelength characteristics measuring section 111 are flattened. However, the present invention is not limited thereto, and the transmission wavelength characteristics of the wavelength characteristics variable module 100 may be feedback controlled, so that the wavelength characteristics of the monitor light have a required wavelength profile.

Figure 8:
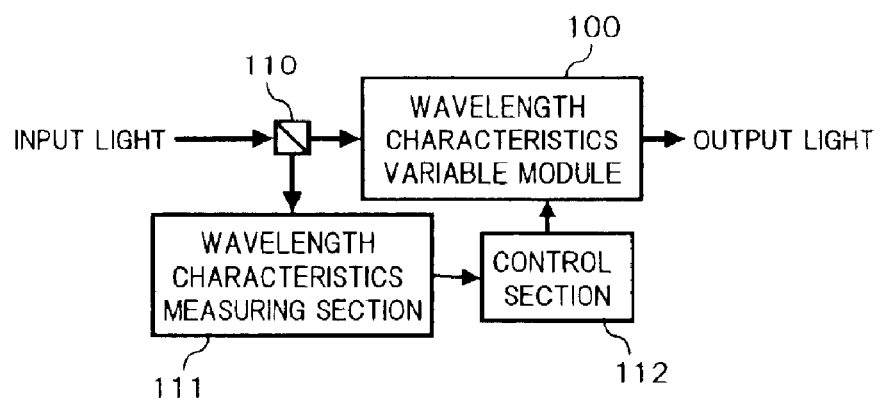
FIG. 8 is a functional block diagram showing another construction example related to the fourth embodiment.

Moreover, in the present invention, the wavelength characteristics of the light output from the wavelength characteristics variable module 100 are monitored to thereby perform the feedback control. However, the present invention is not limited thereto, and, for example as shown in FIG. 8, the optical branching device 110 may be provided on the input side of the wavelength characteristics variable module 100, to monitor the wavelength characteristics of the light input to the wavelength characteristics variable module 100, and based on the monitoring result, the transmission wavelength characteristics of the wavelength characteristics variable module 100 may be feedback controlled.

A wavelength characteristics variable apparatus according to a fifth embodiment of the present invention will now be described.

Figure 9:
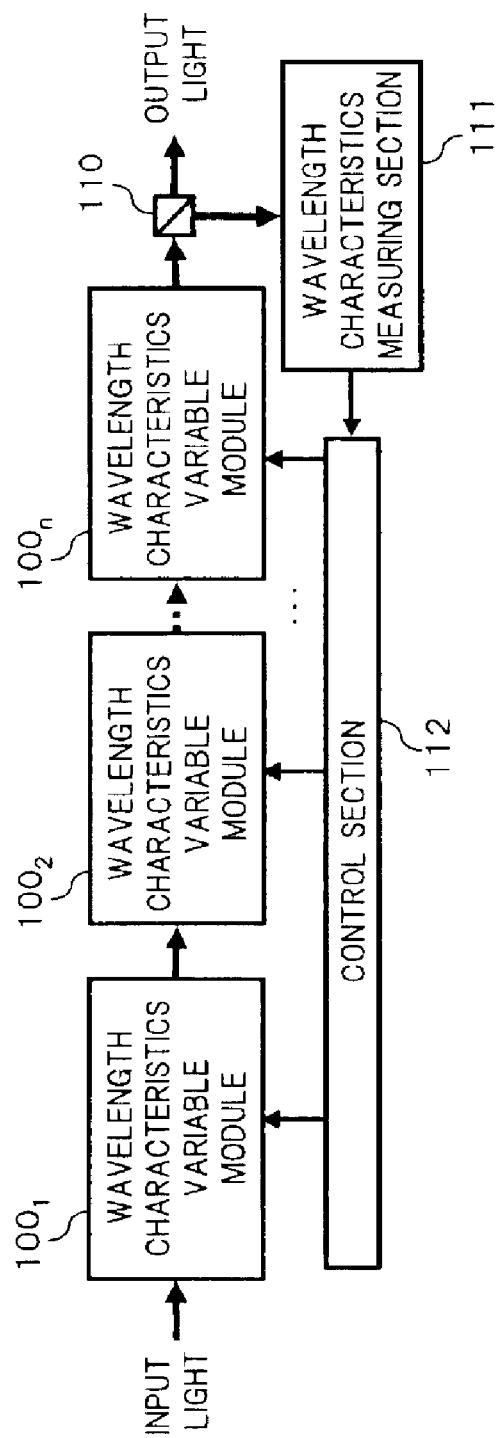
FIG. 9 is a functional block diagram showing the whole construction of a wavelength characteristics variable apparatus according to a fifth embodiment of the present invention.

FIG. 9 is a functional block diagram showing the whole construction of the wavelength characteristics variable apparatus according to the fifth embodiment.

In FIG. 9, the wavelength characteristics variable apparatus has a construction such that in the construction of the fourth embodiment shown in FIG. 7, a plurality of (herein, n in number) wavelength characteristics variable modules $100_1$ to $100_n$ are serially connected, the wavelength characteristics of the light output from the wavelength characteristics variable module $100_n$ of n-th stage are monitored using the optical branching device 110 and the wavelength characteristics measuring section 111, and based on the monitoring result, the transmission wavelength characteristics of each of the wavelength characteristics variable modules $100_1$ to $100_n$ are respectively feedback controlled by the control section 112.

The transmission wavelength characteristics of each of the wavelength characteristics variable modules $100_1$ to $100_n$ are designed so that the period with respect to the wavelength (FSR) is different from each other, and are set such that the sum of the transmission wavelength characteristics when all the wavelength characteristics variable modules $100_1$ to $100_n$ are combined together becomes a desired profile, by variably controlling the amplitude of each of the periodic wavelength characteristics corresponding to the current value of the variable current source 4.

According to the wavelength characteristics variable apparatus in the fifth embodiment, it becomes possible to realize transmission wavelength characteristics having a more complicated shape, by serially connecting a plurality of wavelength characteristics variable modules $100_1$ to $100_n$. Moreover, the wavelength characteristics of the light output from the wavelength characteristics variable module $100_n$ are monitored, and based on the monitoring result, the transmission wavelength characteristics of each of the wavelength characteristics variable modules $100_1$ to $100_n$ are respectively feedback controlled. As a result, it is possible to realize a wavelength characteristics variable apparatus which can output light having stable wavelength characteristics.

Figure 10:
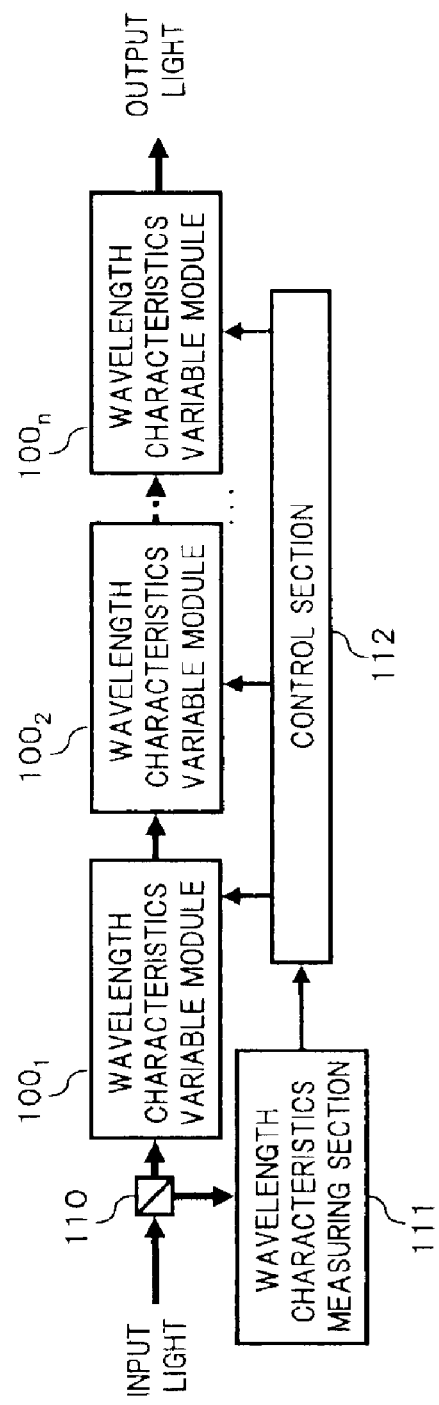
FIG. 10 is a functional block diagram showing another construction example related to the fifth embodiment.

Also in the fifth embodiment, the wavelength characteristics of the light output from the wavelength characteristics variable module $100_n$ are monitored to feedback control each of the wavelength characteristics variable modules $100_1$ to $100_n$. However, as shown in FIG. 10, the optical branching device 110 may be arranged at the previous stage of the wavelength characteristics variable module $100_1$, so that the wavelength characteristics of the light input to the wavelength characteristics variable module 100 are monitored, to perform feedforward control of each of the wavelength characteristics variable modules $100_1$ to $100_n$.

An optical amplifier using the wavelength characteristics variable apparatus according to the present invention will now be described.

Figure 11:
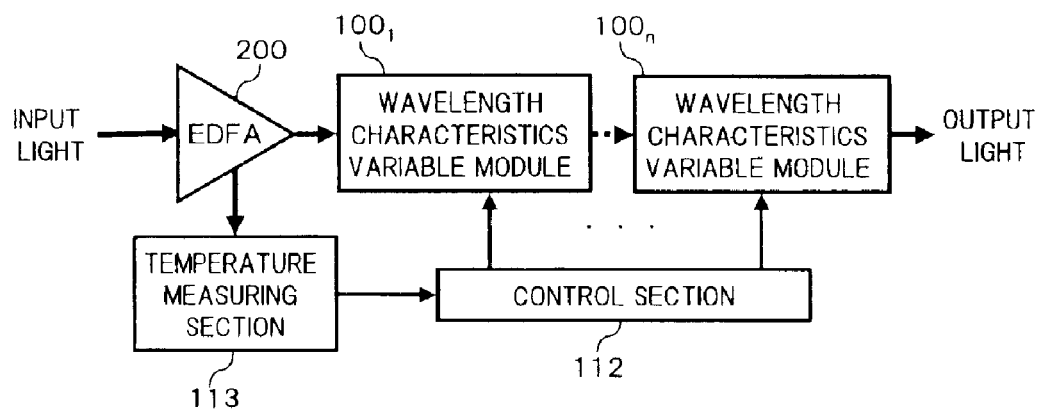
FIG. 11 is a functional block diagram showing the construction of an optical amplifier according to a sixth embodiment of the present invention.

FIG. 11 is a functional block diagram showing the construction of an optical amplifier according to a sixth embodiment of the present invention.

In FIG. 11, the optical amplifier in the sixth embodiment includes, for example, an erbium-doped optical fiber amplifier (EDFA) 200, a plurality of (herein, n in number) wavelength characteristics variable modules $100_1$ to $100_n$ serially connected to the subsequent stage of the EDFA 200, a temperature measuring section 113 that measures the temperature of the EDFA 200, and a control section 112 that feedforward controls the transmission wavelength characteristics of each of the wavelength characteristics variable modules $100_1$ to $100_n$.

Figure 12:
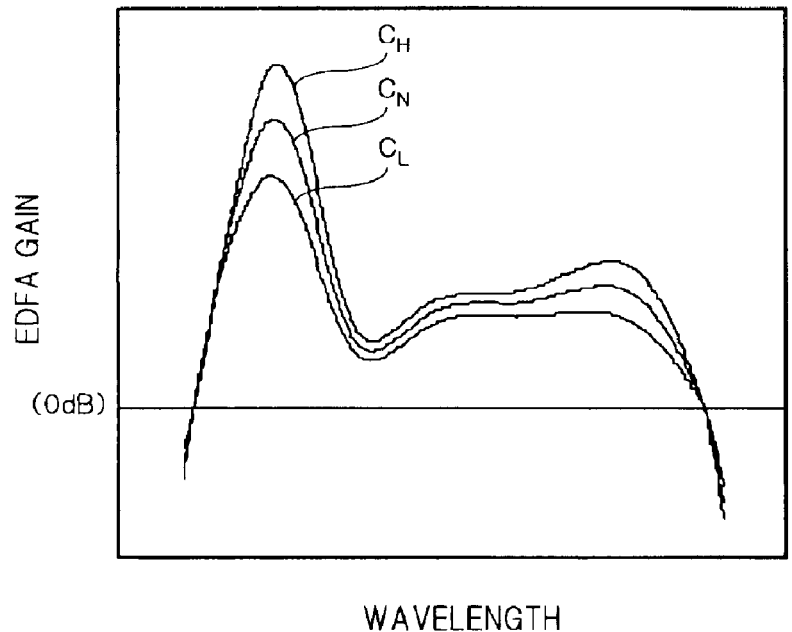
FIG. 12 is a diagram for explaining gain wavelength characteristics of an EDFA in the sixth embodiment.

The EDFA 200 comprises a construction similar to that of the known EDFA, and is assumed herein to show gain wavelength characteristics as shown in FIG. 12, for example. In FIG. 12, the characteristic indicated by symbol $C_N$ is one example of the gain wavelength characteristics at the normal temperature, the characteristic indicated by symbol $C_H$ is one example of the gain wavelength characteristics at the high temperature, and the characteristic indicated by symbol $C_L$ is one example of the gain wavelength characteristics at the low temperature. As seen from the example in FIG. 12, the gain wavelength characteristics of the EDFA 200 change according to the temperature, and equalization (flattening) of the gain wavelength characteristics, taking such a temperature change into consideration, is performed by the wavelength characteristics variable modules $100_1$ to $100_n$ in the subsequent stage.

Each of the wavelength characteristics variable modules $100_1$ to $100_n$ is obtained by modularization of the construction of the wavelength characteristics variable apparatus in the second or third embodiment shown in FIG. 4 to FIG. 6. The transmission wavelength characteristics of each of the wavelength characteristics variable modules $100_1$ to $100_n$ are designed in advance for each required temperature, for example, by using the conventional Fourier series expansion method, with respect to the wavelength characteristics inverse to the gain wavelength characteristics of the EDFA 200.

Figure 13:
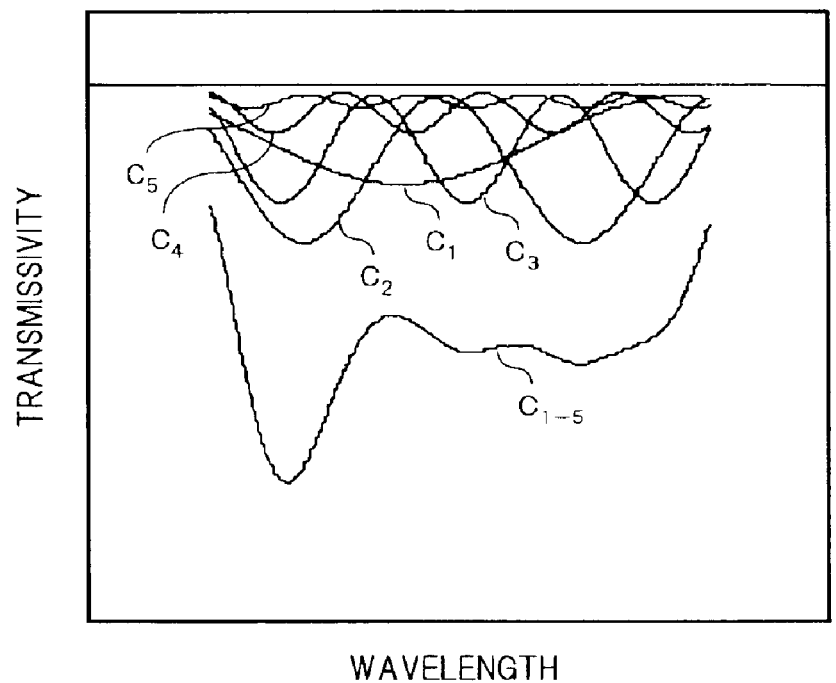
FIG. 13 is a diagram showing one example of transmission wavelength characteristics of each module capable of varying wavelength characteristics at the normal temperature obtained by Fourier series expansion, and the transmission wavelength characteristics obtained by combining these transmission wavelength characteristics in the sixth embodiment.
Figure 14:
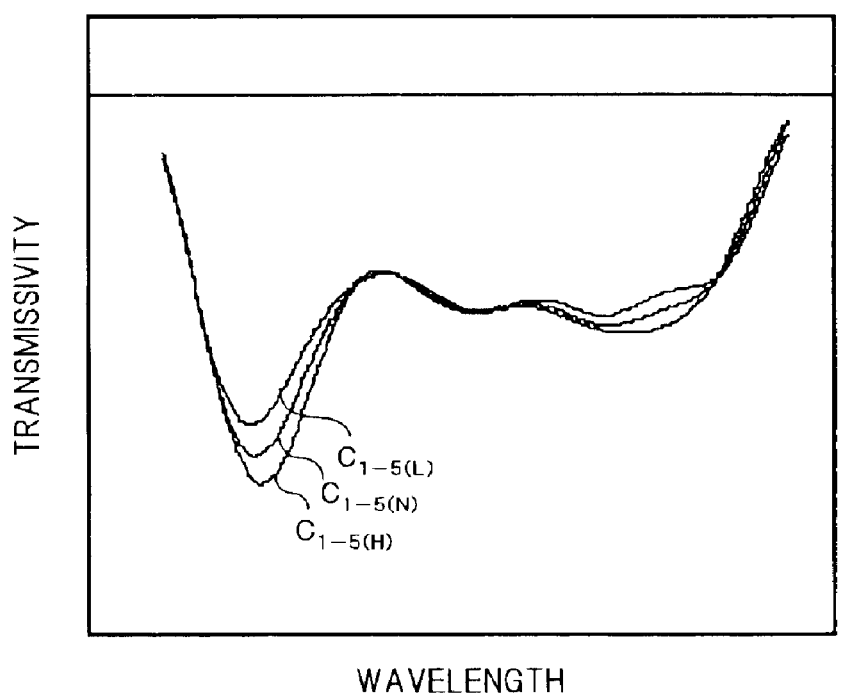
FIG. 14 is a diagram showing one example of temperature characteristics of the combined transmission wavelength characteristics in the sixth embodiment.

FIG. 13 is a diagram showing an example of the respective transmission wavelength characteristics of wavelength characteristics variable modules $100_1$ to $100_n$ obtained by the Fourier series expansion, and the transmission wavelength characteristics obtained by combining these, at the normal temperature. In FIG. 13, the inverse of the gain wavelength characteristics of the EDFA 200 at the normal temperature is subjected to the Fourier series expansion, to design the transmission wavelength characteristics $C_1$ to $C_5$ of the respective wavelength characteristics variable modules $100_1$ to $100_5$, so as to match with the "sine" function of from the first term to the fifth term. Thus, a combined transmission wavelength characteristic $C_{1-5}$ is obtained by serially connecting each of the wavelength characteristics variable modules $100_1$ to $100_5$. Moreover, the transmission wavelength characteristics corresponding to the inverse of the gain wavelength characteristics of the EDFA 200 at the high temperature and at the low temperature can be obtained, by changing each amplitude of the transmission wavelength characteristics $C_1$ to $C_5$ of the respective wavelength characteristics variable modules $100_1$ to $100_5$ at the normal temperature. FIG. 14 shows an example of the characteristics $C_{1-5(N)}$, $C_{1-5(H)}$, $C_{1-5(L)}$ obtained by combining the transmission wavelength characteristics of the wavelength characteristics variable modules 100, to 1005 at the normal temperature, the high temperature and the low temperature.

The temperature measuring section 113 measures the temperature of the EDFA 200, and outputs a signal indicating the measurement result to the control section 112.

The control section 112 stores control values (current values of the variable current source 4) corresponding to the transmission wavelength characteristics of the respective wavelength characteristics variable modules $100_1$ to $100_n$ designed by, for example, the Fourier series expansion or the like as described above, corresponding to the required temperatures, and reads out the control value corresponding to the temperature measured by the temperature measuring section 113, to control the current value of the variable current source 4 for each of the wavelength characteristics variable modules $100_1$ to $100_n$.

Figure 15:
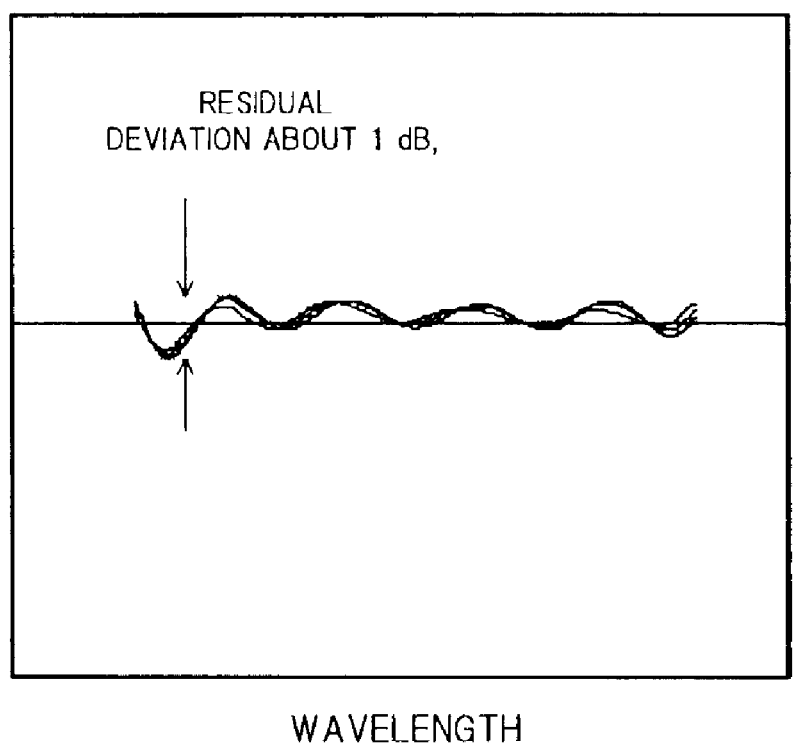
FIG. 15 is a diagram showing one example of the result of gain equalization in the sixth embodiment.

In the optical amplifier having the above described construction, the optical signal input to the EDFA 200 is amplified according to the gain wavelength characteristics shown in FIG. 12, to be output to the wavelength characteristics variable module $100_1$ in the first stage. At this time, the temperature of the EDFA 200 is measured by the temperature measuring section 113, and the measurement result is sent to the control section 112. As a result, the transmission wavelength characteristics of each of the wavelength characteristics variable modules $100_1$ to $100_n$ are feedforward controlled, in accordance with the control value corresponding to the measured temperature. The optical signal output from the EDFA 200 passes through each of the wavelength characteristics variable modules $100_1$ to $100_n$ sequentially, to thereby perform gain equalization according to the transmission wavelength characteristics as shown in FIG. 13 and FIG. 14. As a result, an optical signal having flattened wavelength characteristics is output from the wavelength characteristics variable module $100_n$. For example, FIG. 15 shows an example in which the result of the gain equalization in the optical amplifier is shown. It is seen that before the gain equalization as shown in FIG. 12, the gain deviation is about 5 dB at maximum at the normal temperature, the high temperature and the low temperature, but after the gain transmission as shown in FIG. 15, the residual deviation is suppressed to about 1 dB.

As described above, according to the optical amplifier in the sixth embodiment, since a plurality of wavelength characteristics variable modules $100_1$ to $100_n$ are serially connected to the subsequent stage of the EDFA 200 to control the transmission wavelength characteristics of each of the wavelength characteristics variable modules $100_1$ to $100_n$ corresponding to the temperature of the EDFA 200, the gain wavelength characteristics of the EDFA 200 inclusive of the temperature change can be actively compensated. As a result, an optical amplifier capable of stably realizing flat gain wavelength characteristics can be provided.

An optical amplifier according to a seventh embodiment of the present invention will now be described.

Figure 16:
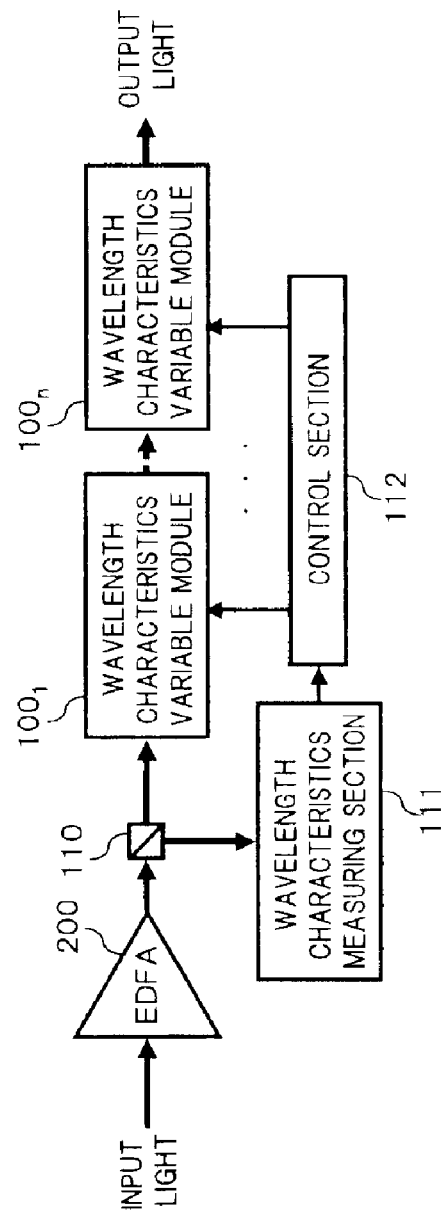
FIG. 16 is a functional block diagram showing the construction of an optical amplifier according to a seventh embodiment of the present invention.

FIG. 16 is a functional block diagram showing the construction of the optical amplifier according to the seventh embodiment.

In FIG. 16, a part in which the construction of this optical amplifier is different from the construction of the optical amplifier in the sixth embodiment shown in FIG. 11 is that the optical branching device 110 and the wavelength characteristics measuring section 111 are provided instead of the temperature measuring section 113. The construction of other parts is the same as in the sixth embodiment.

The optical branching device 110 branches a part of the optical signal output from the EDFA 200 to the wavelength characteristics variable module $100_1$, and outputs it as a monitor light to the wavelength characteristics measuring section 111. The wavelength characteristics measuring section 111 measures the optical power with respect to the wavelength for the monitor light from the optical branching device 110, and transmits the measurement result to the control section 112.

In the optical amplifier having such a construction, a part of the optical signal amplified by the EDFA 200 is branched by the optical branching device 110 as a monitor light and sent to the wavelength characteristics measuring section 111, and the gain wavelength characteristics of the EDFA 200 is actually measured, and the measurement result is transmitted to the control section 112. In the control section 112, for example, the inverse of the gain wavelength characteristics of the EDFA 200 actually measured by the wavelength characteristics measuring section 111 is subjected to the Fourier series expansion or the like, to calculate the transmission wavelength characteristics of each of the wavelength characteristics variable modules $100_1$ to $100_n$, and each of the wavelength characteristics variable modules $100_1$ to $100_n$ is feedforward controlled in accordance with the calculation result. The optical signal output from the EDFA 200 then passes through each of the wavelength characteristics variable modules $100_1$ to $100_n$ sequentially, so that an optical signal having substantially flat wavelength characteristics is output from the wavelength characteristics variable module $100_n$.

According to the optical amplifier in the seventh embodiment described above, an effect similar to that of the sixth embodiment can be obtained by controlling the transmission wavelength characteristics of each of the wavelength characteristics variable modules $100_1$ to $100_n$ according to the gain wavelength characteristics of the EDFA 200 actually measured by the wavelength characteristics measuring section 111. By actually measuring the gain wavelength characteristics of the EDFA 200, the transmission wavelength characteristics of each of the wavelength characteristics variable modules $100_1$ to $100_n$ can be optimized with respect to not only a change in the gain wavelength characteristics due to a temperature change, but also, for example, a change in the gain wavelength characteristics when the concentration of the additive in the EDF is changed, and a change in the gain wavelength characteristics when the input light level is changed at the time of operation of the ALC. Hence, it becomes possible to realize more stable gain equalization.

In the seventh embodiment, the optical branching device 110 is arranged between the EDFA 200 and the wavelength characteristics variable module $100_1$, so as to feedforward control the transmission wavelength characteristics of each of the wavelength characteristics variable modules $100_1$ to $100_n$. But in addition to this, the optical branching device 110 may be arranged in the subsequent stage of the wavelength characteristics variable module $100_n$, to feedback control the transmission wavelength characteristics of each of the wavelength characteristics variable modules $100_1$ to $100_n$.

An optical amplifier according to an eighth embodiment of the present invention will now be described.

Figure 17:
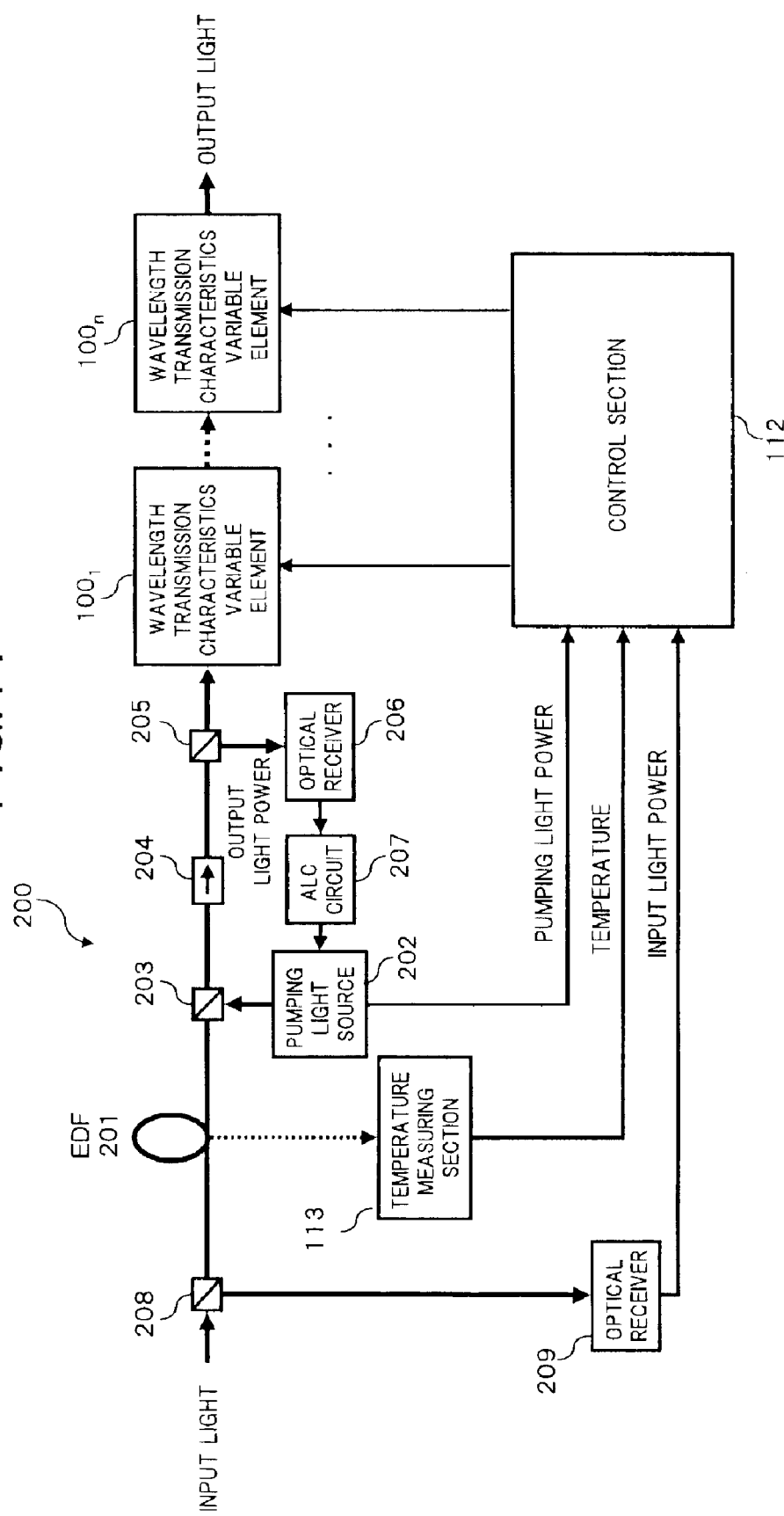
FIG. 17 is a functional block diagram showing the construction of an optical amplifier according to an eighth embodiment of the present invention.

FIG. 17 is a functional block diagram showing the construction of the optical amplifier according to the eighth embodiment.

In FIG. 17, in this optical amplifier, the control section 112 feedforward controlling the transmission wavelength characteristics of each of the wavelength characteristics variable modules $100_1$ to $100_n$ serially connected to the subsequent stage of the EDFA 200, judges the inverse of the gain wavelength characteristics of the EDFA 200, based on the monitoring result of the input light power, the pumping light power and the temperature of the EDFA 200, and controls the current value of the variable current source 4 for each of the wavelength characteristics variable modules $100_1$ to $100_n$, according to the inverse.

Specifically, the EDFA 200 includes, for example, an erbium-doped optical fiber (EDF) 201, a pumping light source 202 generating pumping light, an optical multiplexer 203 supplying the pumping light to the EDF 201, an optical isolator 204 arranged in the subsequent stage of the optical multiplexer 203, an optical branching device 205 branching a part of the optical signal having been amplified by the EDF 201 and passed through the optical multiplexer 203 and the optical isolator 204, a light receiver 206 receiving the branched light from the optical branching device 205 to detect an output light power, an ALC circuit 207 controlling a drive condition of the pumping light source 202 so that the output light power detected by the light receiver 206 becomes constant at a level set in advance, an optical branching device 208 branching a part of the optical signal to be input to the EDF 201, a light receiver 209 receiving the branched light from the optical branching device 208 to detect an input light power, and a temperature measuring section 113 comprising a temperature sensor measuring the temperature of the EDF 201.

The control section 112 is input with information related to the input light power detected by the light receiver 209 of the EDFA 200, the pumping light power output from the pumping light source 202 and the temperature measured by the temperature sensor, respectively, and judges the inverse of the gain wavelength characteristics of the EDFA 200 based on this information. With this judgment method of the inverse, for example, it is possible that the gain wavelength characteristics of the EDFA 200 corresponding to the input light power, the pumping light power and the temperature are stored in the control section 112 beforehand, and the corresponding gain wavelength characteristics are read out in response to the input information from the EDFA 200 to determine the inverse. The control section 112 subjects the judged inverse to the Fourier series expansion or the like, to calculate the transmission wavelength characteristics of each of the wavelength characteristics variable modules $100_1$ to $100_n$, and feedforward controls each of the wavelength characteristics variable modules $100_1$ to $100_n$ in accordance with the calculation result.

As described above, according to the optical amplifier in the eighth embodiment, an effect similar to that of the seventh embodiment can be obtained by controlling the transmission wavelength characteristics of each of the wavelength characteristics variable modules $100_1$ to $100_n$ corresponding to the gain wavelength characteristics judged based on the input light power, the pumping light power and the temperature of the EDFA 200.

In the above eighth embodiment, a backward pumping type construction is exemplified as the EDFA 200, but the construction of the EDFA 200 in the present invention is not limited thereto, and a forward pumping type or a bi-directional pumping type construction may be used. The present invention is also applicable to an EDFA having a multistage amplifying construction in which a plurality of EDFs is connected in series or parallel with each other. Further, the optical amplifier of the present invention is not limited to one using the EDFA, but known optical amplifiers such as an optical fiber amplifier using a rare earth element-doped fiber in which a rare earth element other than erbium is doped, or a semiconductor optical amplifier can be used.

Next, an optical transmission system using the wavelength characteristics variable apparatus, or the optical amplifier according to the present invention will now be described.

Figure 18:
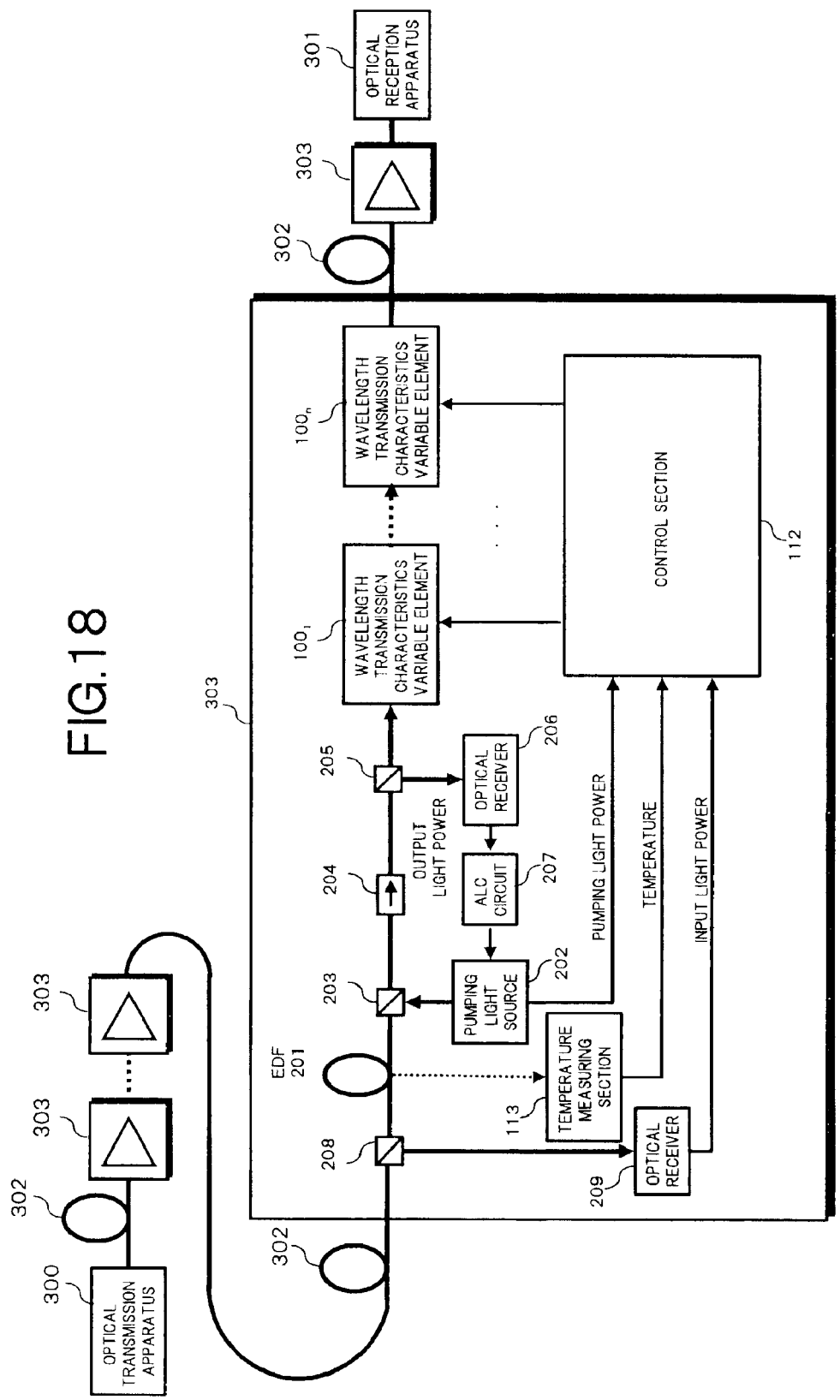
FIG. 18 is a block diagram showing the construction of an optical transmission system according to a ninth embodiment of the present invention.

FIG. 18 is a block diagram showing the construction of an optical transmission system according to a ninth embodiment of the present invention.

In FIG. 18, the optical transmission system has a construction in which, for example, an optical transmission apparatus 300 and an optical reception apparatus 301 are connected by an optical fiber transmission line 302, and a plurality of optical repeaters 303 is arranged with required intervals therebetween on the optical fiber transmission line 302, wherein each optical repeater 303 comprises the optical amplifier of, for example, the eighth embodiment shown in FIG. 17.

In such an optical transmission system, wavelength division multiplex (WDM) signal light transmitted from the optical transmission apparatus 300 to the optical fiber transmission line 302 is repeatedly transmitted to the optical reception apparatus 301, while being amplified to a required level. At this time, in each optical repeater 303, gain equalization of the EDFA 200 is performed in the same manner as in the eighth embodiment, and hence even when a temperature change or the like occurs in each optical repeater 303, a WDM signal light having flat wavelength characteristics is output from each optical repeater 303 to the optical fiber transmission line 302. As a result, the optical reception apparatus 301 can receive the optical signal of each channel with the optical SNR equalized. Hence, it becomes possible to provide an optical transmission system realizing excellent transmission characteristics.

In the optical transmission system in the ninth embodiment, there is shown a case where each optical repeater 303 comprises the optical amplifier in the eighth embodiment, but the present invention is not limited thereto, and each optical repeater 303 may comprise the optical amplifier in the sixth embodiment or the seventh embodiment. Moreover, a plurality of optical repeaters 303 is arranged on the optical fiber transmission line 302, but the construction may be such that one optical repeater 303 is arranged on the optical fiber transmission line 302.

An optical transmission system according to a tenth embodiment of the present invention will now be described.

Figure 19:
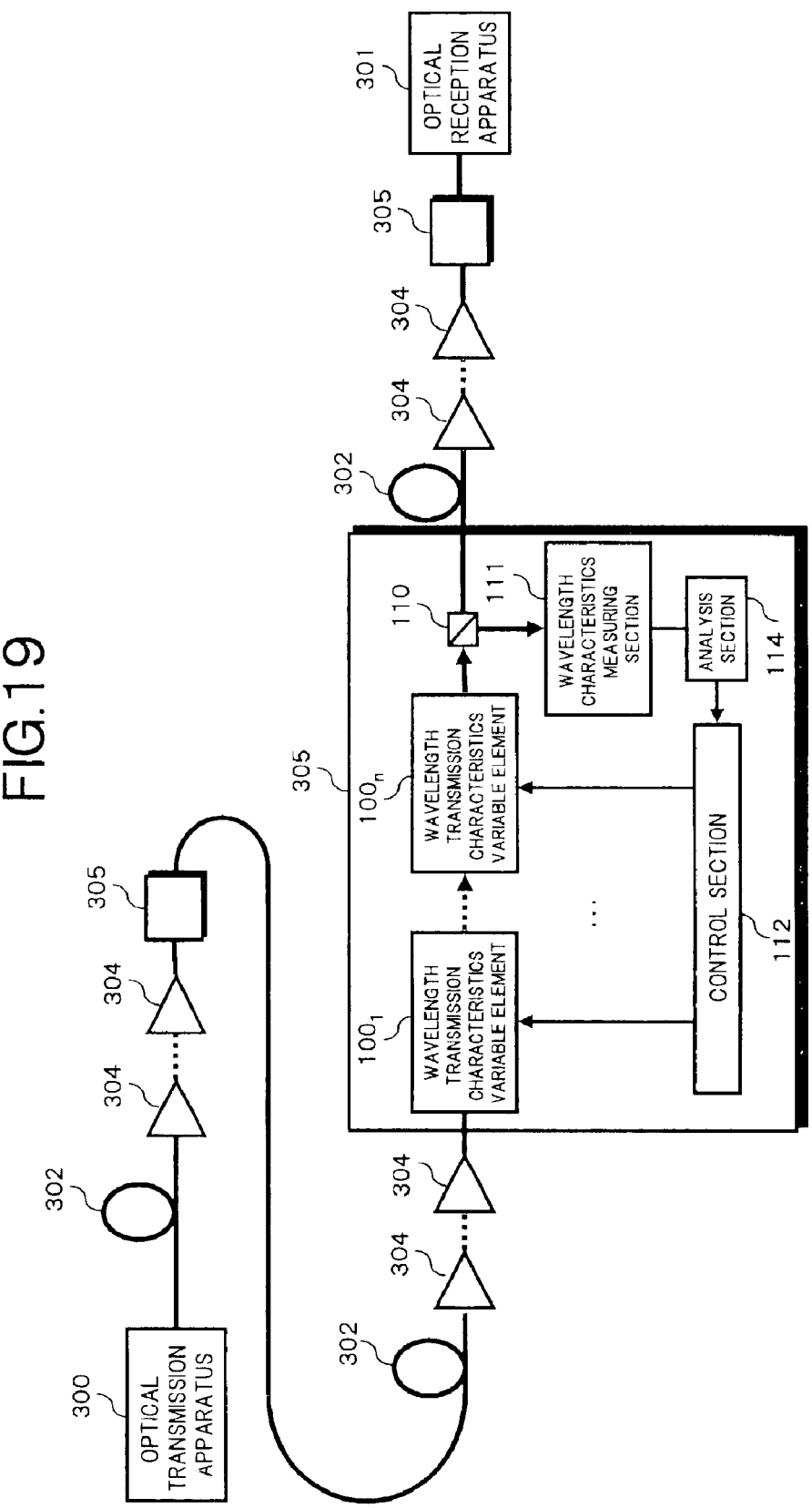
FIG. 19 is a block diagram showing the construction of an optical transmission system according to a tenth embodiment of the present invention.

FIG. 19 is a block diagram showing the construction of the optical transmission system according to the tenth embodiment of the present invention.

In FIG. 19, the optical transmission system has a system configuration in which, for example, an optical transmission apparatus 300 and an optical reception apparatus 301 are connected by an optical fiber transmission line 302, and a plurality of optical repeaters 304 and a plurality of wavelength characteristics variable apparatuses 305 are arranged on the optical fiber transmission line 302.

Differently from those of the ninth embodiment, the optical repeaters 304 are optical repeaters of the conventional construction provided on the optical fiber transmission line 302 with required intervals. The wavelength characteristics variable apparatuses 305 are wavelength characteristics variable apparatuses of the same construction as in the fifth embodiment shown in FIG. 9 arranged for each previously set repeating section.

In such an optical transmission system, wavelength division multiplex (WDM) signal light transmitted from the optical transmission apparatus 300 to the optical fiber transmission line 302 is amplified to a required level by each optical repeater 304, and passes through the wavelength characteristics variable apparatus 305 arranged for each required repeating section. Hence, the wavelength dependency which occurs in the optical fiber transmission line 302 and the optical repeaters 304 (deviation of the optical power between optical signals of respective channels) is equalized, and a WDM signal light having substantially flat wavelength characteristics is repeatedly transmitted to the optical reception apparatus 301. Each wavelength characteristics variable apparatus 305 measures the wavelength characteristics of the monitor light obtained by branching a part of the transmitted light, specifically in the same manner as in the ninth embodiment, and here, based on the measurement result, the inverse of the wavelength characteristics of the monitor light is subjected to the Fourier series expansion or the like in an analysis section 114, to thereby calculate the transmission wavelength characteristics of each of the wavelength characteristics variable modules $100_1$ to $100_n$. Based on the calculation result, the control section 112 feedback controls the transmission wavelength characteristics of each of the wavelength characteristics variable modules $100_1$ to $100_n$. As a result, the optical reception apparatus 301 can receive the optical signal of each channel with the optical SNR equalized. Hence, it becomes possible to provide an optical transmission system realizing excellent transmission characteristics.

Figure 20:
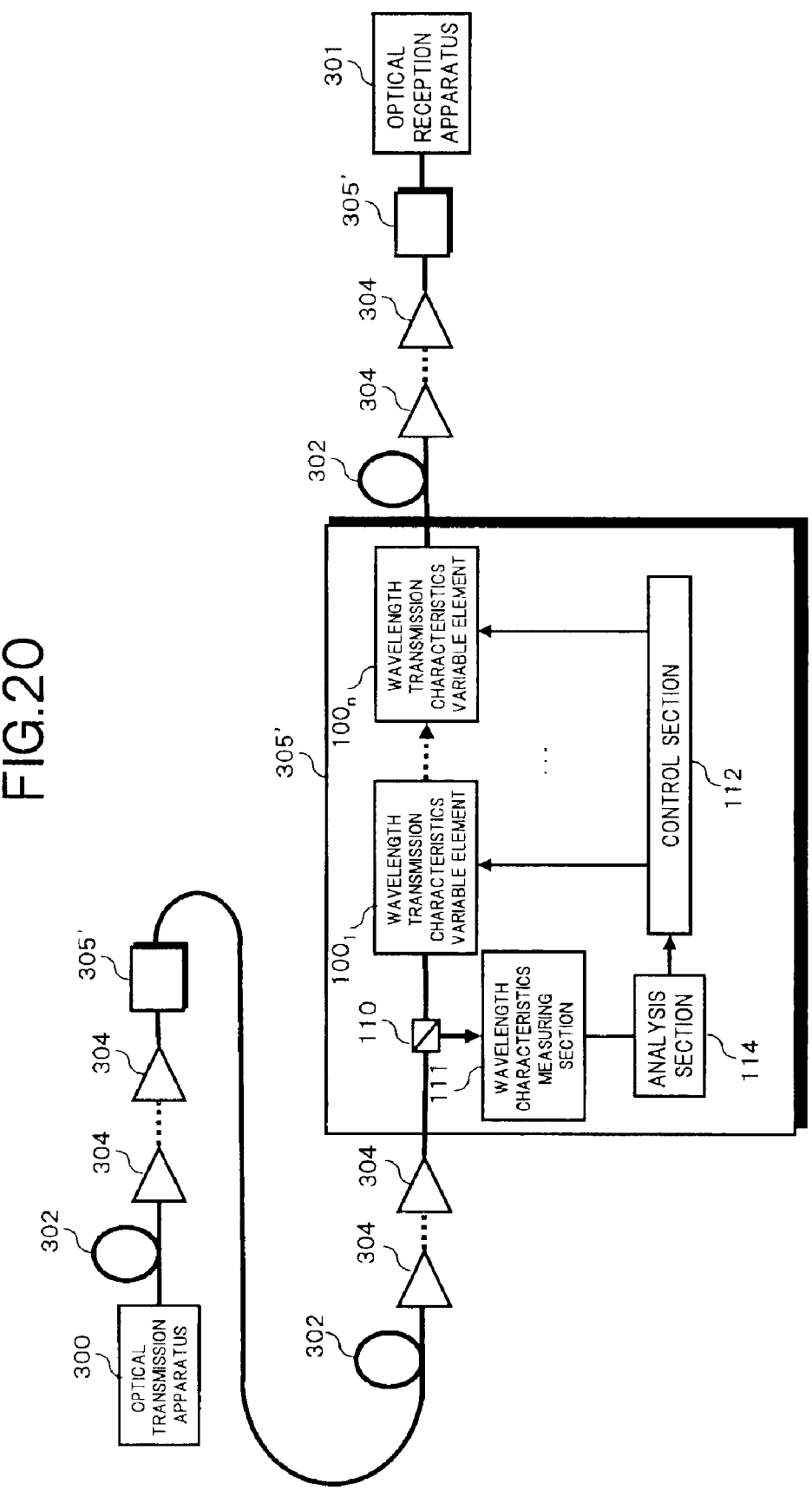
FIG. 20 is a functional block diagram showing another construction example related to the tenth embodiment.

In the optical transmission system in the tenth embodiment, as each wavelength characteristics variable apparatus 305, the construction in which the transmission wavelength characteristics of the wavelength characteristics variable modules $100_1$ to $100_n$ are feedback controlled is shown. However, for example as shown in FIG. 20, a wavelength characteristics variable apparatus 305' having a construction such that the transmission wavelength characteristics of the wavelength characteristics variable modules $100_1$ to $100_n$ are feedforward controlled may be used.

What is claimed is:

1. A transmission wavelength characteristics variable optical element capable of giving a variable Faraday rotation angle to transmitted light, and comprising:

a magneto-optic crystal in which light reflection occurs respectively on a light incident plane and a light emitting plane of the magneto-optic crystal to operate as a Fabry-Perot interferometer, to thereby make periodic transmission wavelength characteristics variable, the light being transmitted through the magneto-optic crystal, and the variable Faraday rotation angle being given by changing a variable magnetic field acting on the magneto-optic crystal.

2. A transmission wavelength characteristics variable optical element according to claim 1 wherein the light incident plane and a light emitting plane of the magneto-optic crystal are parallel with each other, the optical element further comprising:

reflection films respectively formed on the light incident plane and light emitting plane of said magneto-optic crystal;

a fixed magnetic field generation section that gives a fixed magnetic field to said magneto-optic crystal;

a variable magnetic field generation section that gives the variable magnetic field to said magneto-optic crystal in a direction different from that of said fixed magnetic field; and a variable magnetic field control section that controls the variable magnetic field generated by said variable magnetic field generation section, wherein transmission wavelength characteristics which occur due to the interference of light multireflected between said reflection films, is varied by changing a Faraday rotation angle given to light being propagated within said magneto-optic crystal, corresponding to a synthetic magnetic field formed by said fixed magnetic field and said variable magnetic field.

3. A transmission wavelength characteristics variable optical element according to claim 2, wherein said reflection film has a reflectance of 5% or more.

4. A transmission wavelength characteristics variable optical element according to claim 3, wherein said reflection film has a reflectance of 50% or less.

5. A wavelength characteristics variable apparatus using the transmission wavelength characteristics variable optical element recited in claim 1, comprising:

a first optical device that determines the polarization of light entering into said optical element;

a second optical device that cuts out specific polarized light from the light emitted from said optical element; and a variable Faraday rotator that is arranged between said first optical device and said second optical device, and gives a Faraday rotation angle according to the Faraday rotation angle given to the transmitted light by said optical element.

6. A wavelength characteristics variable apparatus according to claim 5, wherein said variable Faraday rotator gives a Faraday rotation angle which is in an opposite rotation direction and which has substantially the same size with respect to the Faraday rotation angle in said optical element, to the transmitted light.

7. A wavelength characteristics variable apparatus according to claim 5, comprising:

a first lens for supplying the light emitted from a core end face of a first optical fiber to said first optical device; and a second optical lens which converges the light emitted from said second optical device and combines said converged light to a core end face of a second optical fiber under a predetermined condition.

8. A wavelength characteristics variable apparatus according to claim 5, wherein said first optical device is a first wedge plate comprising a birefringent material, and said second optical device is a second wedge plate comprising a birefringent material, and the top and the bottom of said second wedge plate are arranged so as to face the bottom and the top of said first wedge plate respectively, and so that corresponding planes are parallel with each other.

9. A wavelength characteristics variable apparatus according to claim 5, wherein said first optical device and said second optical device are a first flat plate and a second flat plate comprising a birefringent material.

10. A wavelength characteristics variable apparatus, wherein the wavelength characteristics variable apparatus recited in claim 5 is modularized to serially connect a plurality of modules, and the period of each module with respect to the wavelength in the transmission wavelength characteristics is set so as to be different to each other, to thereby obtain variable transmission wavelength characteristics corresponding to the sum of respective transmission wavelength characteristics.

11. A wavelength characteristics variable apparatus according to claim 5, comprising:

a light branching section that branches a part of light after having been transmitted through said optical element;

a wavelength characteristics measuring section that measures the wavelength characteristics of the branched light from said light branching section; and a control section that adjusts the Faraday rotation angle given to the transmitted light by said optical element to control the transmission wavelength characteristics, based on the measurement result of said wavelength characteristics measuring section.

12. A wavelength characteristics variable apparatus according to claim 5, comprising:

a light branching section that branches a part of light before being transmitted through said optical element;

a wavelength characteristics measuring section that measures the wavelength characteristics of the branched light from said light branching section; and a control section that adjusts the Faraday rotation angle given to the transmitted light by said optical element to control the transmission wavelength characteristics, based on the measurement result of said wavelength characteristics measuring section.

13. An optical amplifier for amplifying and outputting optical signals, wherein said optical amplifier comprises the wavelength characteristics variable apparatus recited in claim 5, and equalization of gain wavelength characteristics is performed by said wavelength characteristics variable apparatus.

14. An optical amplifier according to claim 13, comprising:
   an optical amplifying section that amplifies light entering into said wavelength characteristics variable apparatus;
   a measurement section that measures data related to the gain wavelength characteristics of said optical amplifying section; and
   a control section that controls the transmission wavelength characteristics by adjusting a Faraday rotation angle given to the transmitted light by the optical element of said wavelength characteristics variable apparatus, so that the gain wavelength characteristics of said optical amplifying section can be equalized, based on the measurement result of said measurement section.

15. An optical amplifier according to claim 14,
   wherein said measurement section measures the temperature of said optical amplifying section, and
   said control section controls the transmission wavelength characteristics of said wavelength characteristics variable apparatus so that said gain wavelength characteristics measured by said measurement section can be equalized.

16. An optical amplifier according to claim 14,
   wherein said measurement section measures the gain wavelength characteristics using the output light of said optical amplifying section, and
   said control section controls the transmission wavelength characteristics of said wavelength characteristics variable apparatus so that the gain wavelength characteristics measured by said measurement section can be equalized.

17. An optical amplifier according to claim 14,
   wherein said control section controls the transmission wavelength characteristics of said wavelength characteristics variable apparatus according to the wavelength characteristics determined by a Fourier series expansion of the inverse of the gain wavelength characteristics of said optical amplifying section.

18. An optical amplifier according to claim 14,
   wherein said optical amplifying section includes a rare earth element-doped optical fiber amplifier.

19. An optical amplifier according to claim 18,
   wherein said measurement section measures input light power, pumping light power, and temperature with regard to said optical amplifying section, and
   said control section judges the gain wavelength characteristics of said optical amplifying section based on the input light power, the pumping light power, and the temperature measured by said measurement section, to control the transmission wavelength characteristics of said wavelength characteristics variable apparatus so that said gain wavelength characteristics can be equalized.

20. An optical transmission system for repeatedly transmitting an optical signal from an optical transmission apparatus to an optical reception apparatus via an optical transmission line and an optical repeater,
   wherein said optical repeater includes the optical amplifier recited in claim 13.

21. An optical transmission system for transmitting an optical signal from an optical transmission apparatus to an optical reception apparatus via an optical transmission line,
   wherein the wavelength characteristics variable apparatus recited in claim 5 is provided on said optical transmission line.

22. An optical transmission system according to claim 21, comprising
   a plurality of optical repeaters on said optical transmission line,
   wherein said wavelength characteristics variable apparatus is arranged for each previously set repeating section.

23. An optical element, comprising:
   a magneto-optic crystal, a first reflecting section and a second reflecting section, and an element that rotates the polarization of light, which is reflected between said first and second reflecting sections via the magneto-optic crystal, according to a magnetic field acting on the magneto-optic crystal to output the light.

24. A control method of transmission wavelength characteristics comprising:
   generating periodic transmission wavelength characteristics by multiple reflection of light between a first reflection plane and a second reflection plane; and
   variably controlling the transmittance without changing the period of said transmission wavelength characteristics with a varying magnetic field acting on the magneto-optic crystal provided between said first and second reflection planes.

25. An optical element, comprising a structure having a first reflection plane and a second reflection plane to operate as a Fabry-Perot interferometer with respect to transmission light, and a magneto-optic crystal through which the transmission light is transmitted,
   wherein said optical element gives Faraday rotation to light traveling between said first reflection plane and said second reflection plane while being reflected repetitively, according to a magnetic field acting on the magneto-optic crystal.

26. An optical element according to claim 25, further comprising a magneto-optic crystal,
   wherein said first reflection plane and said second reflection plane are a light incident plane and light emitting plane of said magneto-optic crystal, and reflection films are formed on said incident plane and emitting plane, respectively.

27. A wavelength characteristics variable apparatus using the optical element recited in claim 25,
   wherein before and after said optical element there is provided a polarizer and analyzer for making the polarization of said transmission light constant.

28. A wavelength characteristics variable apparatus according to claim 27,
   wherein a Faraday rotation angle substantially the same as but in an opposite direction to said Faraday rotation angle is given to light output from said optical element.

29. A wavelength characteristics variable apparatus,
   wherein before and after the optical element recited in claim 25, a wavelength characteristics variable apparatus provided with a polarizer and analyzer for making the polarization of said transmission light constant is modularized to serially connect a plurality of modules, and at least two or more modules are provided with said optical elements with different free spectral ranges.

30. A wavelength characteristics variable apparatus,
   wherein the wavelength characteristics variable apparatus recited in claim 29 is modularized to serially connect a plurality of modules, and at least one or more modules gives a Faraday rotation angle substantially the same as but in an opposite direction to said Faraday rotation angle, to light output from said optical element.

31. An optical amplifier for amplifying and outputting optical signals,
wherein said optical amplifier comprises the wavelength characteristics variable apparatus recited in claim 29, equalization of gain wavelength characteristics is performed by said wavelength characteristics variable apparatus.

32. An optical amplifier according to claim 31, comprising:
an optical amplifying section that amplifies light entering into said wavelength characteristics variable apparatus;
a measurement section that measures data related to the gain wavelength characteristics of said optical amplifying section; and
a control section that controls the transmission wavelength characteristics by adjusting a Faraday rotation angle given to the transmitted light by the optical element of said wavelength characteristics variable apparatus, so that the gain wavelength characteristics of said optical amplifying section can be equalized, based on the measurement result of said measurement section.

33. An optical amplifier according to claim 32,
wherein said control section controls the transmission wavelength characteristics of said wavelength characteristics variable apparatus according to the wavelength characteristics determined by a Fourier series expansion of the Inverse of the gain wavelength characteristics of said optical amplifying section.

34. An optical amplifier according to claim 33,
wherein said measurement section measures input light power, pumping light power, and temperature with regard to said optical amplifying section, and
said control section judges the gain wavelength characteristics of said optical amplifying section based on the input light power, the pumping light power, and the temperature measured by said measurement section, to control the transmission wavelength characteristics of said wavelength characteristics variable apparatus so that said gain wavelength characteristics can be equalized.

35. An optical transmission system for repeatedly transmitting an optical signal from an optical transmission apparatus to an optical reception apparatus via an optical transmission line and an optical repeater,
wherein said optical repeater includes the optical amplifier recited in claim 31.

36. An optical transmission system for transmitting an optical signal from an optical transmission apparatus to an optical reception apparatus via an optical transmission line,
wherein the wavelength characteristics variable apparatus recited in claim 29 is provided on said optical transmission line.

37. An optical transmission system according to claim 36, comprising
a plurality of optical repeaters on said optical transmission line,
wherein said wavelength characteristics variable apparatus is arranged for each previously set repeating section.

38. An optical element capable of giving a variable Faraday rotation angle to light being transmitted through a magneto-optic crystal, and comprising a structure of a Fabry-Perot interferometer in which reflection films are formed on a light incident plane and light emitting plane of said magneto-optic crystal, respectively, with light traveling between said reflection films while being reflected repetitively.

39. An apparatus to give a variable Faraday rotation angle to light, which is transmitted through a magneto-optic crystal, according to a magnetic field acting on the magneto-optic crystal, comprising:
means for reflecting the transmitted light on a light incident plane and a light emitting plane of the magneto-optic crystal to operate as a Fabry-Perot interferometer, to thereby make periodic transmission wavelength characteristics of the light variable.

40. A transmission wavelength characteristics variable optical element comprising:
a magneto-optic crystal comprising first and second parallel planes to reflect light therebetween;
a generator to generate a magnetic field to the magneto-optical crystal; and
a controller to vary the magnetic field to thereby give a variable Faraday rotation angle to the light.

* * * * *

UNITED STATES PATENT AND TRADEMARK OFFICE
CERTIFICATE OF CORRECTION

PATENT NO. : 6,862,126 B2
DATED : March 1, 2005
INVENTOR(S) : Takashi Ishiwada et al.

It is certified that error appears in the above-identified patent and that said Letters Patent is hereby corrected as shown below:

Column 25,
Line 5, at the beginning of the sentence, please insert -- and --.
Line 28, change "Inverse" to -- inverse --.

Signed and Sealed this

Thirtieth Day of August, 2005

JON W. DUDAS
*Director of the United States Patent and Trademark Office*